US008602860B2

(12) United States Patent
Verardi et al.

(10) Patent No.: US 8,602,860 B2
(45) Date of Patent: Dec. 10, 2013

(54) MULTI-PLAY POKER GAME WITH POOL HAND

(75) Inventors: Francesco Verardi, Douglas (GB); Michael Paul Novellie, Ballakillowey (GB)

(73) Assignee: Cork Group Trading Ltd., Tortola (VG)

( * ) Notice: Subject to any disclaimer, the term of this patent is extended or adjusted under 35 U.S.C. 154(b) by 1312 days.

(21) Appl. No.: 11/058,680

(22) Filed: Feb. 14, 2005

(65) Prior Publication Data

US 2006/0183526 A1 Aug. 17, 2006

(51) Int. Cl.
*A63F 13/00* (2006.01)

(52) U.S. Cl.
USPC .................................. 463/13; 463/12; 463/16

(58) Field of Classification Search
USPC ........................... 463/12, 13, 16, 17; 273/192
See application file for complete search history.

(56) References Cited

U.S. PATENT DOCUMENTS

| | | | | |
|---|---|---|---|---|
| 5,118,109 | A | 6/1992 | Gumina | 273/139 |
| 5,732,950 | A | 3/1998 | Moody | 273/292 |
| 5,816,915 | A * | 10/1998 | Kadlic | 463/13 |
| 5,823,873 | A * | 10/1998 | Moody | 463/13 |
| 5,957,774 | A * | 9/1999 | Holmes et al. | 463/13 |
| 5,976,016 | A * | 11/1999 | Moody et al. | 463/13 |
| 6,007,066 | A | 12/1999 | Moody | 273/292 |
| 6,098,985 | A * | 8/2000 | Moody | 273/292 |
| 6,120,378 | A | 9/2000 | Moody et al. | 463/20 |
| 6,474,645 | B2 | 11/2002 | Tarantino | 273/272 |
| 6,517,074 | B1 * | 2/2003 | Moody et al. | 273/292 |
| 6,561,898 | B2 | 5/2003 | Moody | 463/13 |
| 6,565,432 | B2 | 5/2003 | Moody | 463/13 |
| 6,568,680 | B1 | 5/2003 | Moody et al. | 273/292 |
| 6,585,587 | B2 * | 7/2003 | Falciglia, Sr. | 463/13 |
| 6,612,927 | B1 * | 9/2003 | Slomiany et al. | 463/16 |
| 6,638,163 | B2 | 10/2003 | Moody | 463/13 |
| 6,729,621 | B2 | 5/2004 | Moody | 273/292 |

(Continued)

FOREIGN PATENT DOCUMENTS

| | | |
|---|---|---|
| EP | 0893147 | 1/1999 |
| WO | WO 03034358 | 4/2003 |
| WO | WO 03093921 | 11/2003 |

OTHER PUBLICATIONS

U.S. Department of Transportation, "Human Factors Design Guide" Chapter 8, Apr. 2003 p. A-77□□http://www.hf.faa.gov/docs/508/docs/CHIchapter8FINAL.pdf□□.*

(Continued)

*Primary Examiner* — James S McClellan
(74) *Attorney, Agent, or Firm* — McDonnell Boehnen Hulbert & Berghoff LLP

(57) ABSTRACT

A method for playing a multiple-play poker game includes the step of displaying a pool hand comprising a plurality of face up cards. The pool hand is not played, subject to wager, or subject to poker hand rankings. The pool hand is provided solely as a means for designation of none, one or more of the cards of the pool hand as held cards. Preferably, at the time of display of the pool hand and designation of held cards, playing hands are not displayed, keeping the player focused on the selection process. The method continues with reproducing the held cards in a plurality of playing hands, completing the plurality of playing hands with new face up cards, if any, and determining a ranking of each of the completed playing hands.

21 Claims, 16 Drawing Sheets

(56) References Cited

U.S. PATENT DOCUMENTS

| | | | | |
|---|---|---|---|---|
| 6,877,747 | B2 | 4/2005 | Moody | 273/292 |
| 6,878,060 | B2 | 4/2005 | Moody | 463/13 |
| 7,056,206 | B2 * | 6/2006 | Aoki et al. | 463/13 |
| 2002/0107063 | A1 | 8/2002 | Ashley et al. | 463/13 |
| 2003/0155716 | A1 | 8/2003 | Parker | 273/292 |
| 2004/0004324 | A1 | 1/2004 | Stefan | 273/292 |
| 2004/0113363 | A1 | 6/2004 | Moody | 273/292 |
| 2004/0160008 | A1 | 8/2004 | Sawyer | 273/292 |
| 2005/0151319 | A1 | 7/2005 | Berman et al. | 273/292 |

OTHER PUBLICATIONS

Extended European Search Report in EP06250789.2, application of Waterleaf Ltd., dated Sep. 5, 2006.

* cited by examiner

117

MULTI-PLAY POKER GAME WITH POOL HAND

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This invention relates to card games and more particularly to methods and apparatus for playing card games, such as poker, multiple times. It also relates to graphical user interface features for a computer or other electronic game device, which are advantageous when playing multi-play games. The methods and user interface features can be used in electronic games, for example games that are provided by a gaming web site on the World Wide Web.

The well-known poker game five-card draw involves each player receiving an initial hand of five cards. One at a time, each player makes a selection of cards they wish to hold. They then discard unwanted cards and receive a replacement of discarded cards. The resulting hand is then ranked in accordance with poker hand rankings and the hand with the highest ranking wins.

U.S. Pat. Nos. 5,823,873 and 6,007,066, both issued to Ernest Moody, disclose multi-hand variations of five-card draw poker, wherein multiple hands are played simultaneously in an electronic video poker format. In one representative example, a card game is played in which three rows of cards are dealt to a player. The player makes a wager for each row of cards. All three rows of cards are dealt face up with each row having the same cards by rank and suit. The player selects none, one or more of the face up cards from one of the rows as cards to be held. The cards that are held are also held in all of the other rows. Replacement cards for the non-selected cards are dealt into each row. The poker hand ranking of each five card hand by row is determined. The player is then paid for any winning poker hands based on a pay table and the amount of the player's wager.

The graphical user interface aspects of the '873 and '066 patents are rudimentary at best and are not especially well suited to many environments, including on-line poker in which a player uses their computer to access a gaming application hosted by a web site on the World Wide Web. There is a need in the art for an improved multi-play poker game, and associated graphical user interface design, which enhances the user experience.

SUMMARY

In a first aspect, a method is disclosed for playing a multiple-hand draw-type poker game. The method includes a step of displaying a pool hand comprising a plurality of face up cards. The pool hand is not a played hand, that is, it is not subject to wagering or poker hand rankings. Rather, it is a hand that is displayed to the player only for purposes of selection of cards to be held. Preferably, at the time of display of the pool hand, the played hands do not exist and are not displayed to the user. As such, the pool hand presents a clear, intuitive, and user friendly format to select cards to be held in multi-play poker. The display of the pool hand results in a satisfying, easy to understand graphical user interface experience. It is considered a substantial improvement over the user interface design of the above-cited Moody patents. In the Moody patents cited previously, the user selects cards to be held from one of the played hands, which confuses the selection of cards and the playing of hands. The use of the pool hand as described herein avoids such confusion.

The method continues with the step of designating none, one or more of the cards of the pool hand as held cards. In an embodiment in which the game is played on a computer terminal, the designation can be made by simply clicking the mouse on the card or cards the player wishes to hold. In one possible embodiment, an icon such as "held" appears over the card to illustrate to the user that they have selected that card as a held card.

After the player has finished the task of selecting none, one or more of the cards of the pool hand as held cards, the player clicks on a "deal" icon. Playing hands now appear in a separate area of the display, such as above the pool hand. The cards that are held are reproduced into a plurality of playing hands. The game may be played with any number of playing hands for multi-hand poker playing, such as five, ten or fifty hands. Each of the playing hands includes the same held cards that were designated as held cards in the pool hand. In some embodiments, the pool hand can be grayed out and only the designated held cards are shown face up, with unselected cards turned over.

The method continues with the step of completing the plurality of playing hands with new, randomly selected, face up cards. For example, if the game is a five card draw game and the user designated two cards in the pool hand (say, for example, a pair of jacks), each of the playing hands is dealt three additional cards. Thus, each played hand includes the same pair of jacks, and three additional randomly selected cards. In a preferred embodiment, the additional cards that are added to complete each hand are dealt from a separate deck of cards. Thus, in this example, the first played hand will include the pair of jacks and three additional random cards from one deck (with the two jacks removed), the second played hand will have the same pair of jacks and three additional random cards from a different deck (with the two jacks removed), etc.

The method continues with the step of determining a ranking of each of the completed playing hands. Each hand is ranked separately. The ranking can be in accordance with standard poker hand rankings.

In a second aspect, a method for facilitating play of a multiple-hand poker game is provided. The method includes a step of displaying a pool hand comprising a plurality of face up cards, wherein the pool hand is not played. The method continues with a step of receiving a selection from a player designating none, one or more of the cards of the pool hand as held cards. The method continues with a step of retaining the held cards in a face up orientation and turning face down any cards of the pool hand not designated as a held card. The method continues by reproducing the held cards in a plurality of playing hands. The method continues with a step of completing the plurality of playing hands with new, face up, randomly selected cards. A ranking is then determined for each of the completed playing hand.

In still another aspect, a method is provided for facilitating play of a multiple-hand poker game. The method comprises a step of receiving a wager associated with a plurality of hands to be played. A pay table may be provided on the screen display to show the odds associated with poker hand rankings that provide for a payback. Here, N is the number of hands that are played in the multi-hand poker game. N could be any integer of 2 or more. The method continues with the steps of dealing a pool hand comprising a plurality of face up cards, wherein the pool hand is not a played hand. The method continues with the steps of receiving a selection designating none, one or more of the cards of the pool hand as held cards, retaining the held cards in a face up orientation and turning face down any cards of the pool hand not designated as one of the held cards, reproducing the held cards in a plurality of playing hands, completing the plurality of playing hands with new face up cards, and determining a ranking of each of the completed playing hands. The method continues with the step of determining a payout amount based on the ranking of each of the played hands, the wager and a pay table.

In still another aspect, an apparatus is provided for playing a multiple-hand poker game. The apparatus comprises a storage medium containing a set of machine-readable instructions (i.e., software instructions) for controlling a display device, such as a video poker machine, computer display or display of any other gaming device. The machine readable instructions, which may be readily coded from the present disclosure by persons skilled in the art, comprise instructions for generating the following displays on the display device: (1) a pool hand, (2) a plurality of playing hands for playing a multiple-hand poker game; (3) a pay table comprising a display of poker hand rankings and the associated payout odds for each hand in the rankings, (4) a control section, the control section comprising at least one of wagering controls, a deal icon and a draw icon; and (5) ranking indicia for illustrating the poker hand ranking of at least one of the playing hands. The ranking indicia can be superimposed over the played hand. For example, if a hand has a poker hand ranking of a flush, the ranking indicia "flush" can appear superimposed over the hand. The ranking indicia may also display the payout for that hand. The total payout for all the played hands is determined by summing the individual payouts for each hand having a minimum poker hand ranking. In one representative embodiment, the instructions for the display are downloaded from a gaming site on the World Wide Web.

BRIEF DESCRIPTION OF THE DRAWINGS

A presently preferred embodiment will be described below in conjunction with the appended drawing Figures, of which.

DETAILED DESCRIPTION OF PREFERRED AND ALTERNATIVE EMBODIMENTS

Figure 1:
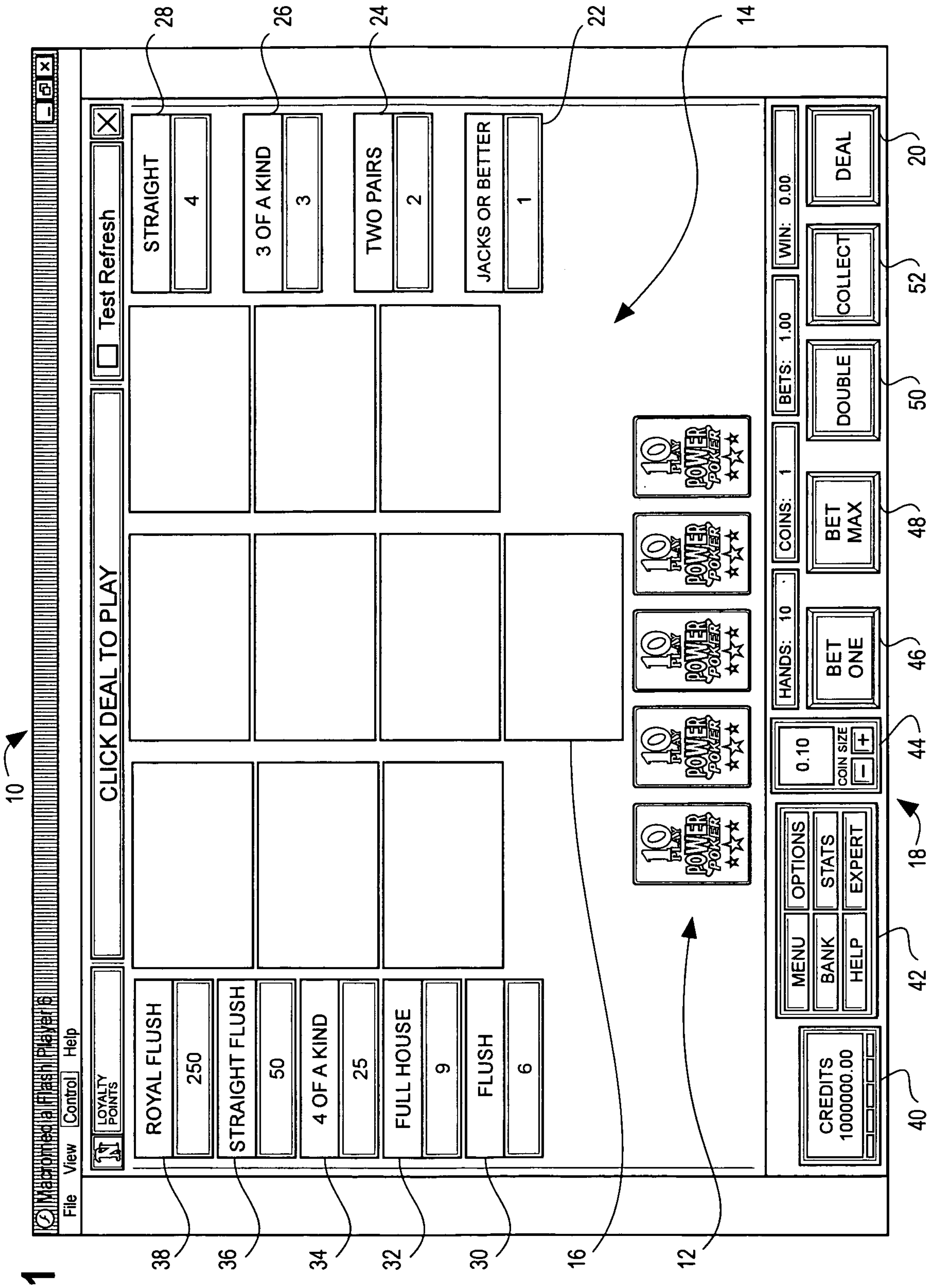
FIG. 1 is a screen shot showing a GUI display which may appear on the display of an electronic gaming device, such as a video poker terminal or display of a computer. The display of FIG. 1 shows the GUI at the commencement of a multi-hand poker game.

Referring now to the drawings, FIG. 1 is a screen shot showing a GUI display 10 that may be provided on a computer screen, video poker terminal or other game device, which is provided to facilitate the playing of multi-play poker games. The display 10 of FIG. 1 is presented to the user at the commencement of a multi-hand poker game.

Before describing the method of playing multi-play poker in detail, some of the features of the display shown of FIG. 1 will be described initially.

The display of FIG. 1 includes a variety of features that are designed to facilitate ease of use. The first feature is the display of a pool hand 12. The pool hand in this embodiment consists of five cards, which are shown face down indicating that the game has not yet commenced. The pool hand 12 is the hand that is used for selection of cards to be held in a draw-type poker hand. The held cards are later presented in each of the playing hands, as will be described in further detail below in conjunction with FIGS. 2-4. The pool hand 12 is not ranked. The pool hand 12 is also not played or subject to any wagering. It merely exists as a convenient vehicle for selection of cards to be held and presented in the playing hands. The number of cards in the pool hand 12 will preferably be the same number of cards in the completed playing hands, described below. For example, where the game is five card draw, the pool hand has five cards and each of the completed playing hands have five cards. It is possible to have a greater or lesser number of cards in the pool hand as compared to the playing hands.

Figure 2:
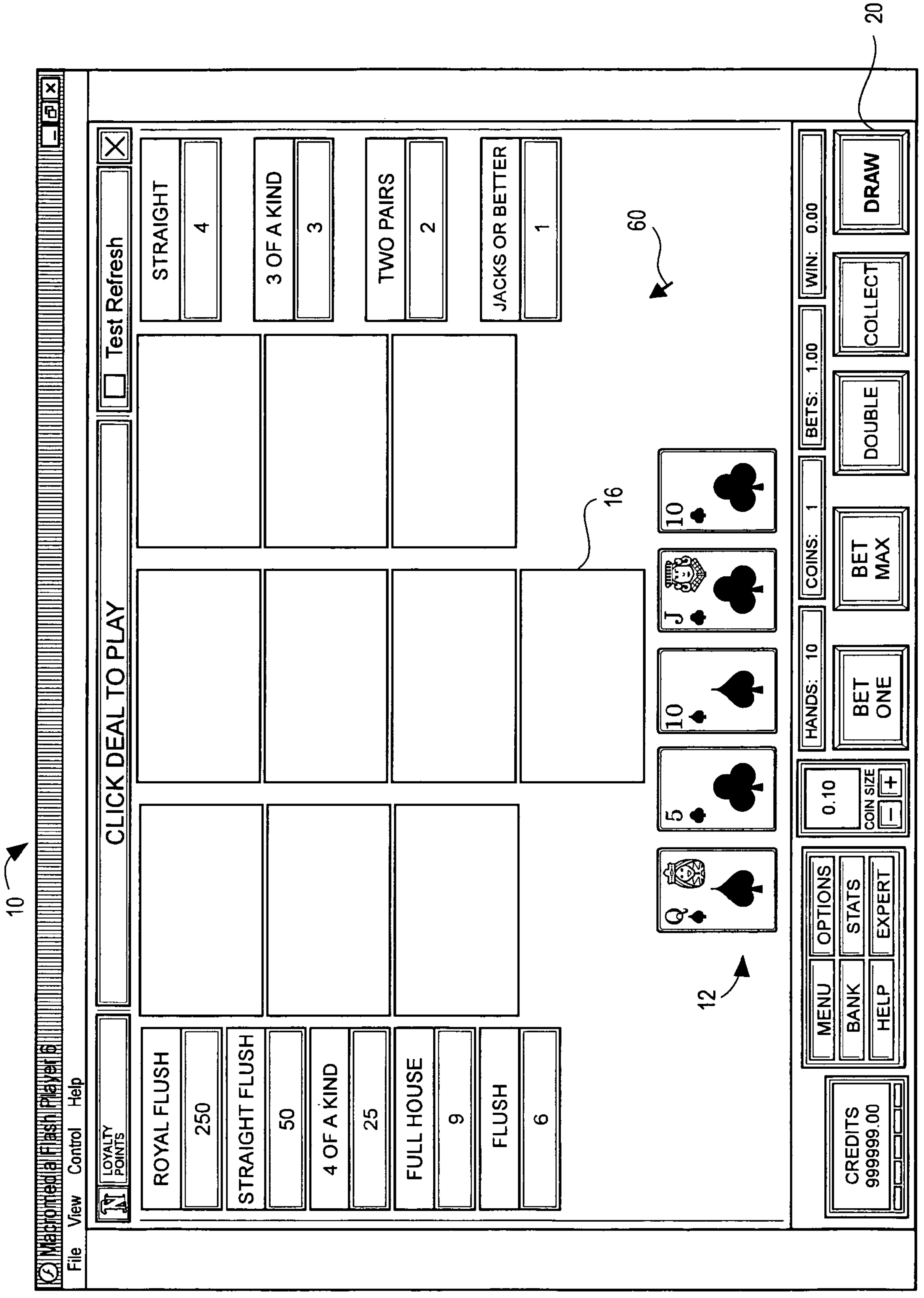
FIG. 2 is a screen shot showing the dealing of a pool hand in the bottom portion of the display.

The display includes a region 14 that is devoted to the later display of the playing hands. The region 14 includes borders 16, each of which delineate the area where a playing hand is later displayed. In FIG. 1, there are ten borders 16, indicating to the user that this particular game is a ten-hand poker game. As shown in FIGS. 1 and 2, at the time of displaying of the pool hand 12 and selection of cards to be held, the playing hands are not displayed and, in preferred embodiments, do not yet exist in computer memory.

The display of FIG. 1 further includes a plurality of boxes 22, 24, 26, 28, 30, 32, 34, 36, 38. The boxes collectively form the pay table for the game. Each box (or entry in the pay table) consists of a poker hand ranking (e.g. "Three of a Kind", "Straight", etc.) and a corresponding number indicating the payout associated with the particular poker hand. A minimum ranking (pair of Jacks in the game of FIG. 1) is needed for a payout.

The game of FIGS. 1-4 is played with ten played hands (see FIG. 2) having an equal amount wagered on each played hand. Each of the played hands is individually ranked and the amount wagered on that played hand is paid in accordance with the pay table. For example, a single played hand with a pair of Jacks will payout the amount wagered on that particular hand (indicated by the "1" in box 22). A single played hand with a Flush poker ranking (five cards in the same suit) will pay out six times the amount wagered on that play hand. Similarly, a Royal Flush hand will pay out 250 times the amount wagered on that play hand. The total payout for playing all ten play hands is equal to the sum of the poker hand rankings for each hand, in accordance with the pay table. In other words, a player obtaining ten hands with a pair of Jacks or better will break even, whereas a player obtaining five hands with a Flush ranking will obtain a payout of three times the amount wagered for all ten hands.

The display further includes a control section 18, where a set of icons are presented which allow the user to exercise control over the wagering of money and the execution of play of the game. The icons in the control section 18 include a deal icon 20. When the deal icon 20 is activated (e.g., by mouse click), the game commences and the five cards in the pool hand 12 are turned face up, as shown in FIG. 2. It will be appreciated that the pool hand 12 shown in FIG. 1 could simply consist of a graphical representation of five cards, in which case the dealing of five random cards from a standard deck of playing cards to form the pool hand 12 does not occur until the deal icon 20 is activated.

The icons in the control section 18 include the leftmost icon 40, which is a credit meter that reflects a running balance of a player's credit account. The balance on the account will vary according to the ebb and flow of the game. The credits meter thus allows the user to track how much money they have won or lost, and helps the user decide whether to quit the game or continue playing.

The controls section 18 icons includes a group of icons 42, which include MENU, BANK, HELP, OPTIONS, STATS and EXPERT icons. The MENU icon, when activated, takes the player through to a "games lobby" display which presents the player with a menu of games available for play. The BANK icon takes the player to a banking application where the player may purchase credit to top up their player account. The HELP icon displays help text describing the rules of the game to the player. The OPTIONS icon allows the player to configure certain game parameters such as, for example, speed of play, sound effects, autohold feature, etc. The STATS icon is used for display of parameters relating to the player's current session of play of this particular game such as, for example, number of hands played to date, duration of current session, hands played per hour, a ranking of the player's highest wins, etc. The EXPERT icon toggles between two modes, EXPERT and REGULAR. These will be described subsequently.

The control section 18 includes a "coin size" set of icons 44, which display the current "coin size" used for the wager on each of the N playing hands. The coin size is $ 0.10 in FIG. 1, denominated in units of credit. There a number of selectable standard "coin sizes", such as $ 1, $0.50, $ 0.10, or other value. The "–" icon decrements the current "coin size" to the next smaller standard size. The "+" icon increments the current "coin size" to the next larger standard size. The current value of the coin size indicates the amount wagered on each of the ten playing hands. For example, if the coin size unit is $ 0.10, that is amount wagered on each hand and a total of $ 1 is wagered on all ten hands.

Figure 4:
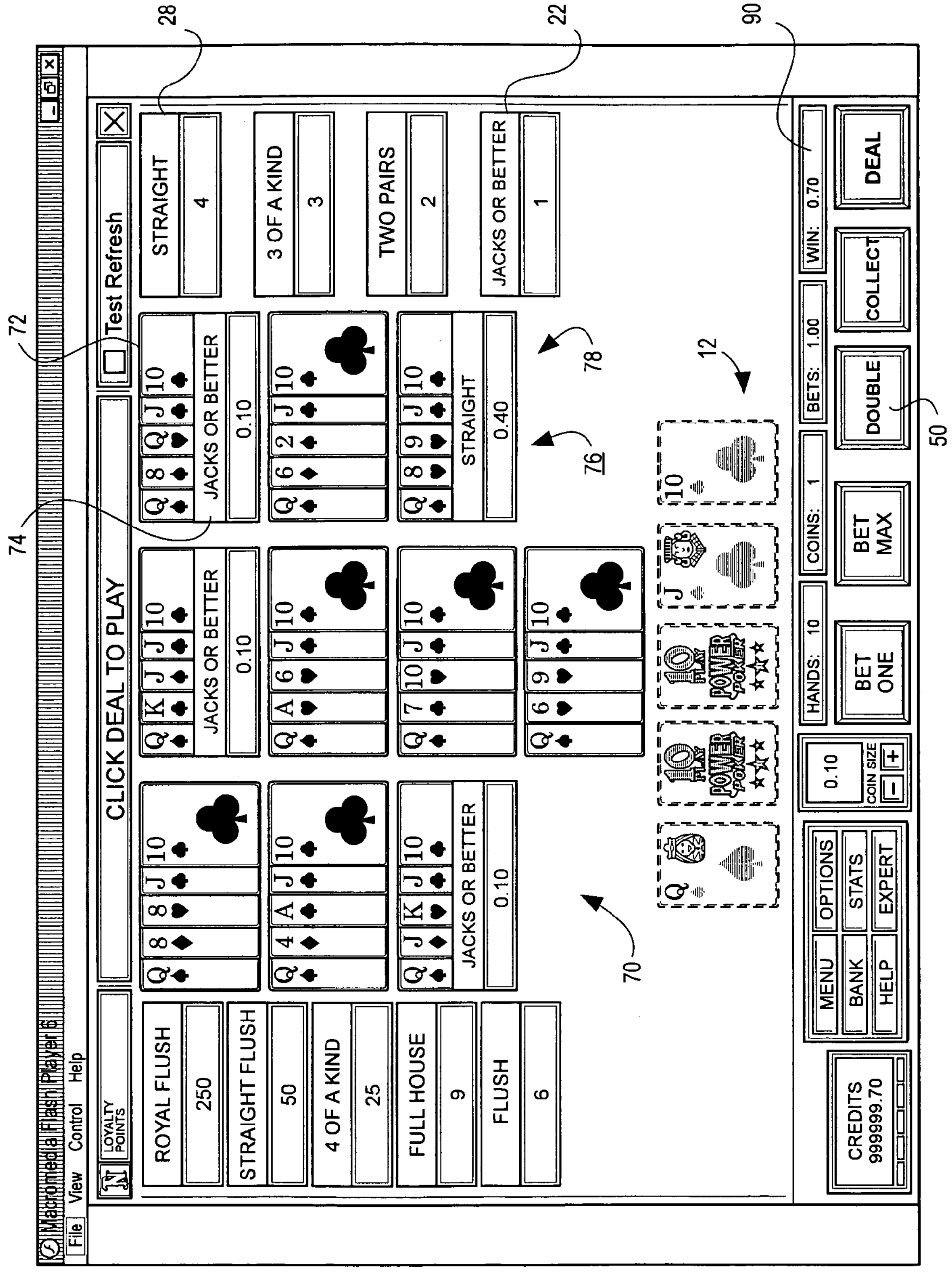
FIG. 4 is a screen shot showing the pool hand "grayed-out" (made less visible) and ten playing hands. Each playing hand has the held cards plus randomly selected cards to make up a hand of five cards.

The DEAL icon 20 toggles between two modes, a DEAL mode and a DRAW mode. In the DEAL mode, the activation of the icon initiates a turn of the game by dealing cards in the pool hand face up, whereupon the icon switches to the DRAW mode. In the DRAW mode, the player selects which cards to hold in the pool hand. When they have finished the selection, they activate the icon 20. The activation initiates a phase of the game in which the held cards are replicated in each play hand and any additional cards are dealt in each play hand to complete the playing hands. The hands are then ranked, as shown in FIG. 4.

The display includes the BET ONE and BET MAX icons 46 and 48. The manner of use of these icons changes depending on whether the player is in EXPERT mode or REGULAR mode (the state of toggling the EXPERT icon in the group of icons 42). In the REGULAR mode, BET ONE increments by 1 the number of coins (or units) of the current standard "coin size" that are wagered on each play hand. There is a minimum value of 1 coin or unit per hand. There is a maximum of 5 coins or units per hand. The BET MAX icon 48 wagers 5 coins of the current standard "coin size" per play hand. When the BET ONE or BET MAX icon is activated, play commences automatically by dealing the cards in the pool hand 12 (i.e., turning the cards face up).

The DOUBLE icon 50 initiates a side game in which the player is given a chance to double his winnings (if any) on the current turn of the game. This side game is explained further below in conjunction with FIGS. 5 and 6.

When the player is in EXPERT mode, several additional icons appear (not shown). An ANALYZE icon appears which displays to the player the probabilities of obtaining a winning poker hand as a function of the cards held in the pool hand. A SHOW HINTS icon displays a warning message to the player each time the player's selection of held cards in the pool hand differs from optimal play by more than a quantifiable threshold. A DEAL 10× icon appears which, when activated, plays 10 consecutive turns of the game automatically without further intervention by the player. A DEAL 5× icon occurs, which when activated, plays 5 consecutive turns of the game automatically without further intervention by the player. An AUTOPLAY icon appears which plays a selectable number of consecutive turns of the game automatically without further intervention by the player. The player is also able to configure stopping rules and a doubling strategy.

When the player has any winnings in a turn of the game, he can elect to either play a double side wager (using icon 50) or collect the winnings. The COLLECT icon 52 allows the player to receive his winnings and the player's credit account balance is updated to reflect these winnings. If the player clicks on the DEAL icon 20 to initiate a new turn of the game, without first having clicked on the COLLECT icon 52 to collect the previous winnings, this action causes a COLLECT operation to occur anyway behind the scenes.

The explanation of play of multi-play poker in accordance with the illustrated embodiment will now be made with reference to FIGS. 1-4. When the user activates the deal icon 20 in FIG. 1, the player is dealt a pool hand 12 of 5 randomly selected cards, face up. See FIG. 2. Note that the deal icon 20 of FIG. 1 has toggled to a draw icon in FIG. 2. No other hands appear on the screen. The screen displays ten placeholders bounded by the borders 16 indicating the locations where ten hands will subsequently be dealt. In a preferred embodiment, at this moment, the additional ten hands do not exist, nor is there any representation (e.g., a file or a data structure) in the computer of what cards are found in the ten hands to be dealt later on. In this example, the pool hand consists of the Queen of Spades, Five of Clubs, Ten of Spades, Jack of Clubs, and Ten of Clubs. The cards of the pool hand 12 are randomly selected from a standard deck of playing cards. The use of Jokers (or other wild cards) in the pool hand is optional.

Figure 3:
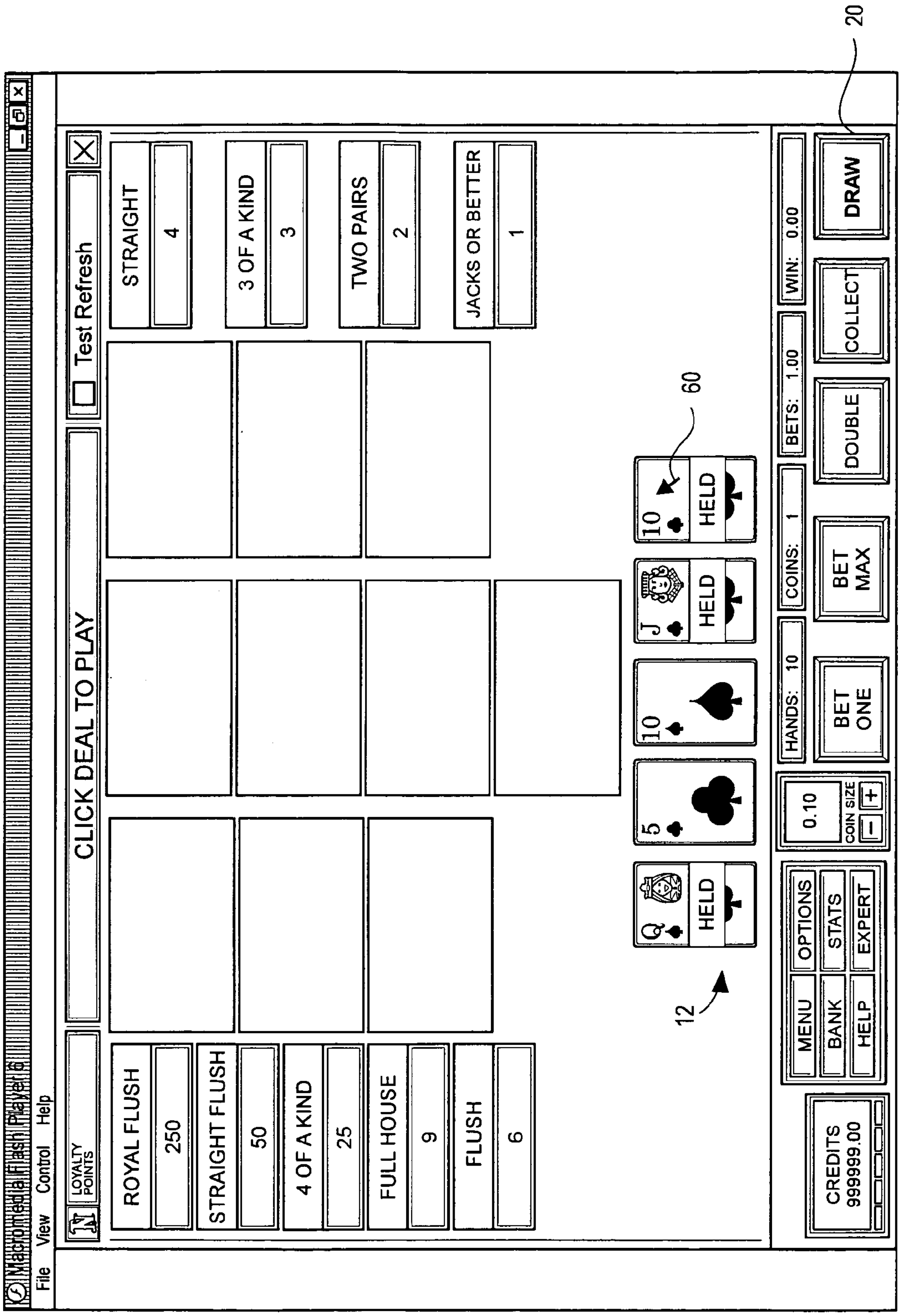
FIG. 3 is a screen shot showing the selection of cards in the pool hand as cards to be held.

The next step in the process is the designation of cards to be held for later replication into each of the playing hands. FIG. 3 is a screen shot showing the selection of cards in the pool hand as cards to be held. The player selects none, one or more cards from the pool hand as cards to be "held", that is, cards that will be present in the ten new hands. To make a designation, the player moves the mouse or cursor 60 over a card in the pool hand 12 they wish to hold and clicks the mouse. (Obviously, if a touch screen is used, the player could touch the card and this action would cause the card to be held.) The selection of a held card is indicated by the "held" legend superimposed on the card. In the example of FIG. 3, the user has elected to hold the Queen of Spades, the Jack of Clubs and the Ten of Clubs, each card having the "held" legend.

After completion of the process of designation of none, one or more held cards, the user activates the draw icon 20.

Referring now to FIG. 4, after the draw icon 20 has been activated in FIG. 3, a number of changes occur on the screen. The pool hand 12 is "grayed out", that is, partially darkened. This is because the pool hand has served its purpose. The cards that were designated as held cards remain in a face up orientation and the cards that were not designated are turned face down, to further emphasize the cards designated as held cards. Note that there is no replacement of un-held cards occurs in the pool hand, as the pool hand has completely served its function. It only remains on the screen to show the player which cards were designated as held cards. The held card or cards from the pool hand (if any) are presented in each of ten new playing hands 70, which are displayed in the central and upper portion of the display. The playing hands 70 are then completed with additional cards (face up) that are dealt at random to complete a hand of five cards. At this point, a representation of the ten new hands exists in computer memory and the cards in each of the ten new playing hands 70 are presented to the user. As can be seen, the Queen of Spades, Jack of Clubs and Ten of Clubs are present in each of the ten played hands 70, in the same position that they occupied in the pool hand 12. Each of the ten played hands includes new cards dealt at random from a standard deck of playing cards. The held cards are removed from the decks used to deal the additional cards to complete the playing hands 70 to avoid any hand having two cards which are exactly the same.

A ranking of the ten playing hands 70 then occurs. The ranking can be done in accordance with standard poker hand rankings. No ranking of the pool hand occurs, as it is not used for playing and remains grayed out. Moreover, non-selected cards are not replaced with new cards in the pool hand. The ten playing hands in the example of FIG. 4 include three hands with a pair of Jacks or better and one hand with a Straight. A ranking of a pair of Jacks or better is needed for any hand to pay out in accordance with the pay table. To facilitate the user's appreciation of the rankings, the boxes 22 and 28 flash to highlight for the user that they had at least one hand of these rankings (pair of Jacks and Straight).

Additionally, ranking indicia in the form of an icon with the rank of the hand is superimposed on each played hand having a minimum poker hand ranking (pair of Jacks or better). Thus, hand 72 has a Jacks or better indicia 74 superimposed over the hand and hand 76 has a Straight indicia 78 superimposed over the hand. The indicia 74 and 78 also indicate the payout for the hand. Jacks or better has a payout of 0.10, which is the payout for Jacks or better (1) multiplied by the coin value of 0.10 units and 1 coin per hand wagered. A Straight has a payout of 0.4, which is the payout for Straight (4) multiplied by the coin value of 0.10 and one coin per hand wagered. Thus, the size of the wager on each hand is the coin size multiplied by the number of coins. The total wager is equal to ten times the wager on each hand (in a ten hand game). The total payout for each hand is equal to the coin size multiplied by the pay table multiplier for the ranking of each hand, multiplied by the number of coins wagered. The total payout for all ten hands is arrived by summing the payouts for the individual hands.

In the example of FIG. 4, the total pay out is 0.70 units (or 70 cents on a dollar wager for all ten hands), since the play resulted in three hands with Jacks or better and one hand with a Straight: [(3×0.10×1 coin wagered per hand)+(4×0.1×1 coin wagered per hand)]. The total payout, 0.70 units, is shown in box 90 in FIG. 4.

Figure 7:
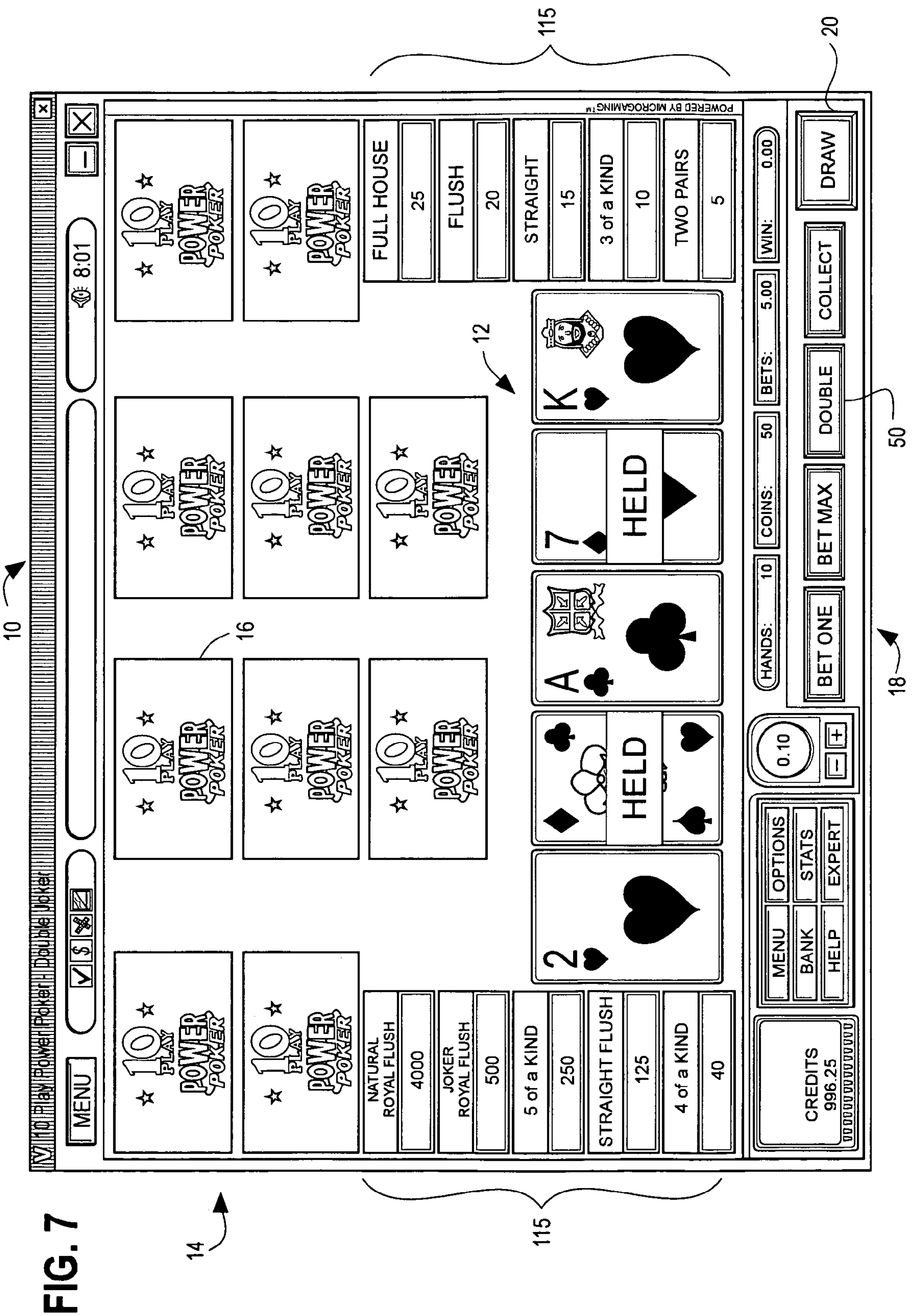
FIGS. 7 and 8 illustrate a graphical user interface design for an alternative embodiment of a multi-play poker game.
Figure 8:
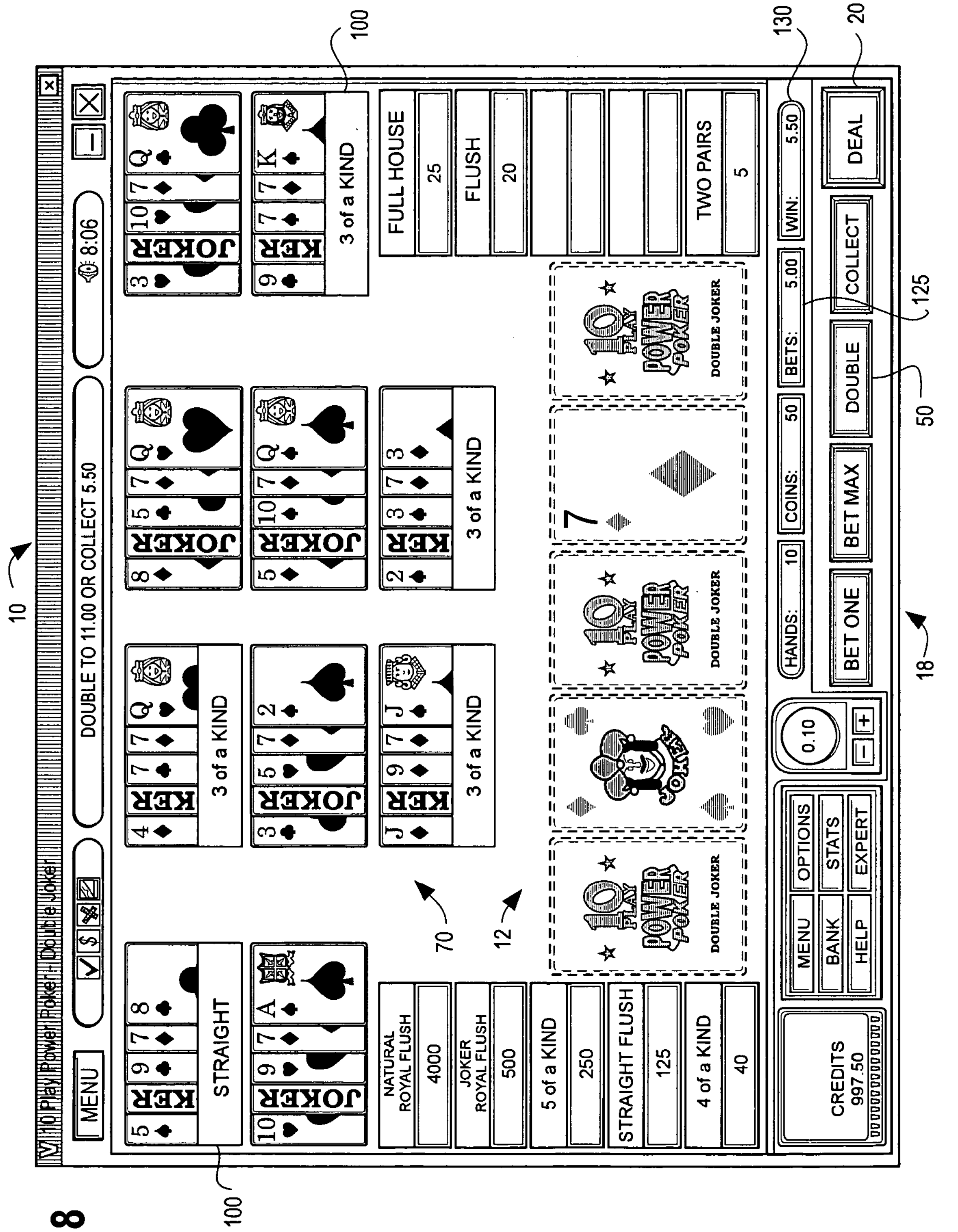

An alternative GUI design for a ten play multi-play poker game is shown in FIGS. 7 and 8. The display 10 includes a region 14 for later display of ten playing hands, with a border or place holder 16 showing the future location for each of the hands. A control section 18 is provided for game playing control icons. A pool hand 12 of five cards selected at random is dealt face up and the user makes designation of held cards using the mouse, as described previously. In this game, the deck of cards is a standard deck of cards plus jokers. The second card over from the left is a Joker and is held, along with the Seven of Diamonds. The player clicks the draw icon 20 and the display changes to that shown in FIG. 8. The two held cards (Joker and Seven of Diamonds) are reproduced in ten playing hands 70. The pool hand 12 is grayed out and the non-designated cards are placed face down. The held cards are reproduced in each of the ten playing hands 70, and additional face-up cards are dealt at random into each hand to complete each of the ten hands. Each hand is dealt from a separate deck with the held cards removed. The ten playing hands are ranked in accordance with a poker hand ranking. The play resulted in four Three of a Kind hands and a Straight. The playing hands with a minimum poker hand ranking (two pairs in this particular game) have ranking indicia 100 superimposed over the hands, as shown. The bet icon 125 shows that the player bet 5 units and won 5.5 units, or a net gain of 0.5 units. In this example, the pay table is slightly different from the game of FIGS. 1-4 since the game includes Jokers. However, the payout for the hand is calculated in the same fashion as explained previously.

Figure 9:
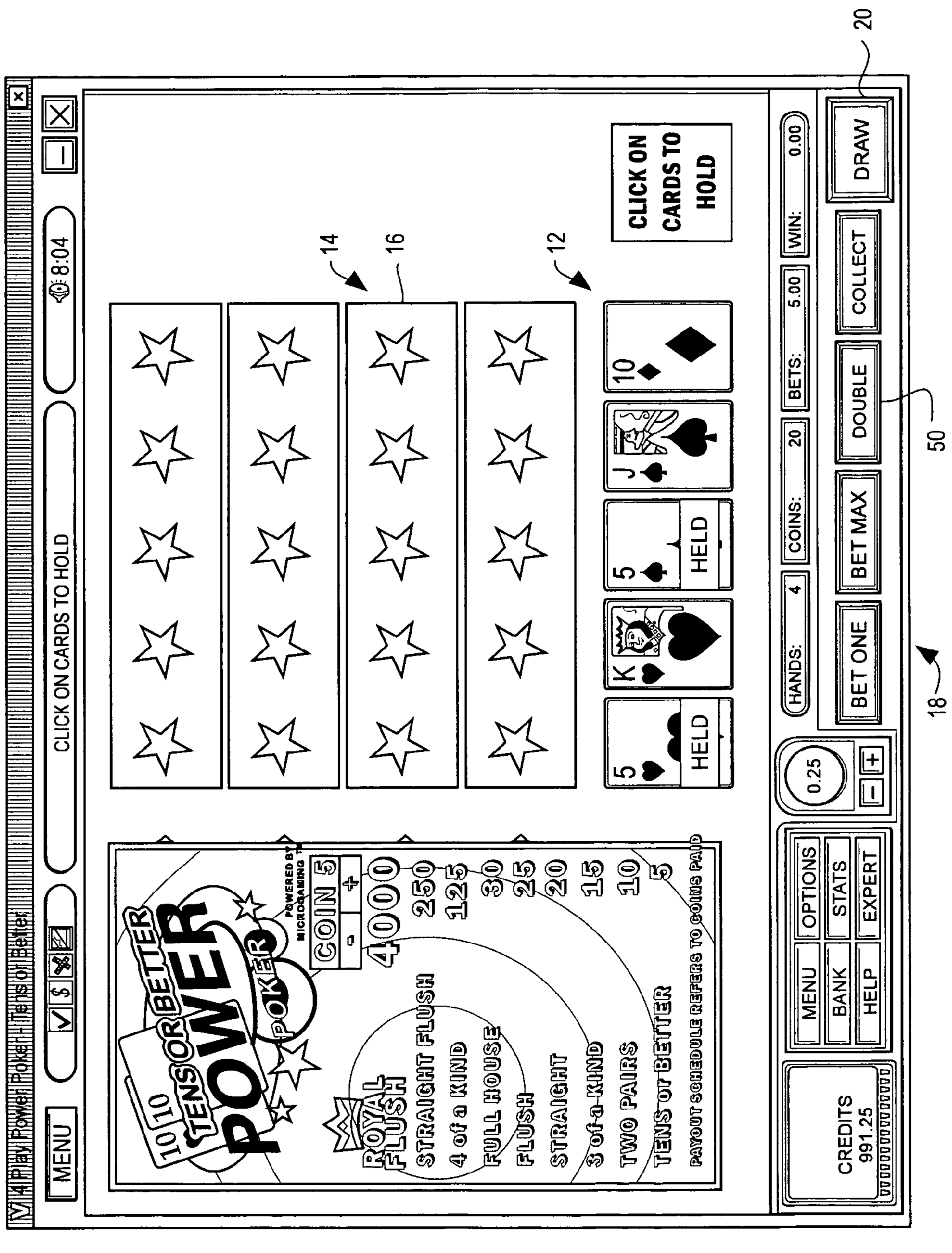
FIGS. 9 and 10 show a graphical user interface design for yet another alternative embodiment of a multi-play poker game.
Figure 10:
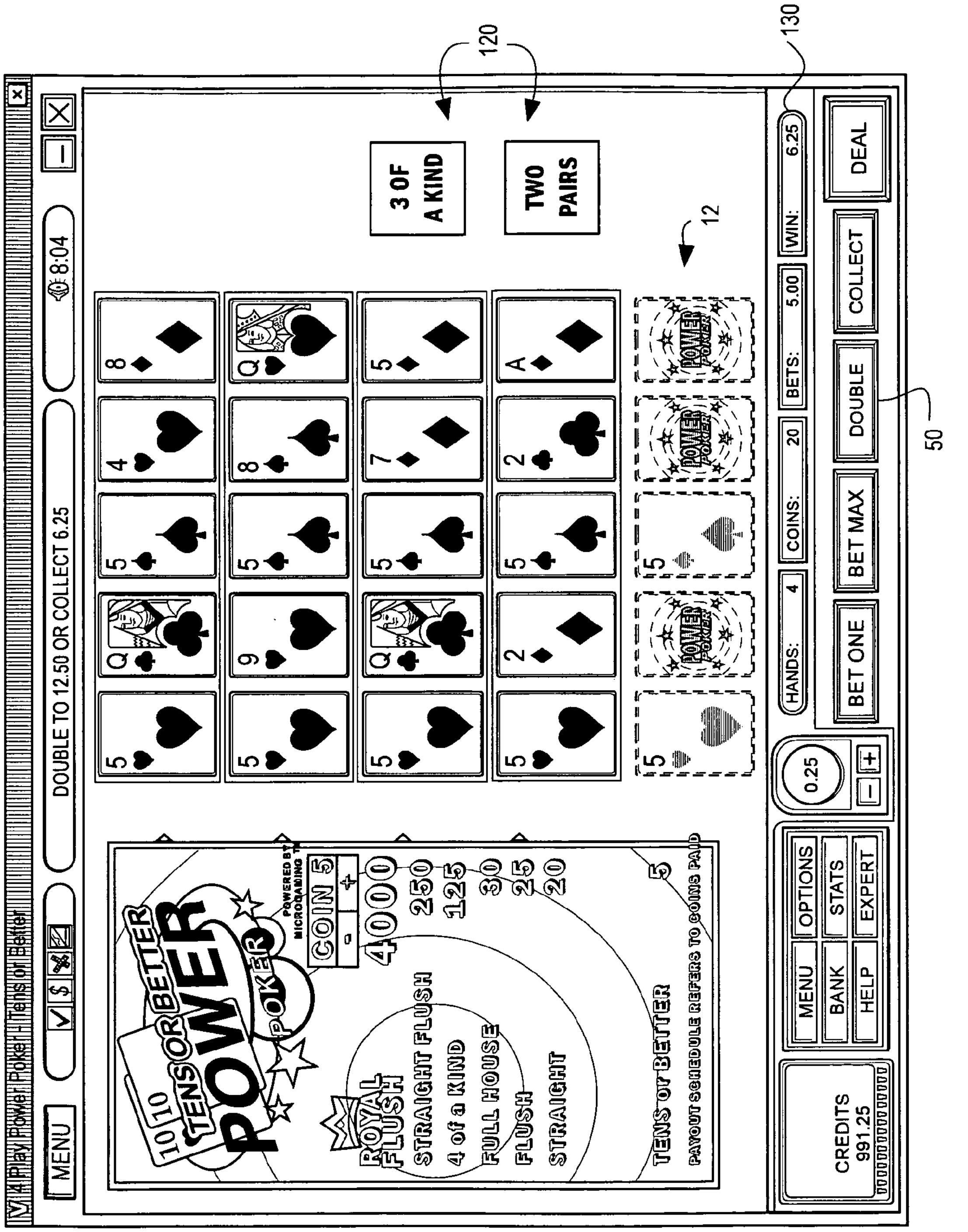

A yet further alternative embodiment is shown in FIGS. 9 and 10. This game is a four hand five-card draw game. Referring to FIG. 9, a pool hand 12 is dealt consisting of five randomly selected cards face up. The player uses the mouse to select cards they wish to hold. The display includes an area 14 where four playing poker hands will be later displayed. Here, the player selected a pair of Fives to hold. The user clicks on the draw icon 20 and the display changes to that of FIG. 10. The pool hand 12 is grayed out and the non-designated cards are placed face down. The held cards (pair of fives) are reproduced into the four playing hands and additional cards are dealt at random to complete the playing hands 70. The four playing hands are then ranked. The play resulted in the lowermost hand having Two Pairs and the hand above it having Three of a Kind. The ranking indicia 120 are displayed to the side, but it would be possible to display the ranking indicia 120 directly over the playing hands as in the case of FIG. 8. As in the case with the other embodiments, the pool hand 12 simply provides a mechanism for selection of held cards and is not played, subject to wager or ranked. In the example of FIG. 10, the player bet five units and won 6.25 units, for a net gain of 1.25 units.

From the foregoing, it will be appreciated that a method for facilitating play of a multiple-play poker game has been described. The method includes a step of displaying a pool hand 12 comprising a plurality of face up cards (FIGS. 2, 7, 9), wherein the pool hand is not played. The method continues with a step of receiving a selection from a player designating none, one or more of the cards of the pool hand as held cards (FIGS. 3, 7, 9). The method continues with a step of retaining the held cards in a face up orientation and turning face down any cards of the pool hand not designated as a held card. (See FIG. 4, lower portion of the display, FIGS. 8, 10). The method continues by reproducing the held cards in a plurality of playing hands. See FIG. 4, 8, 10, playing hands 70). The method continues with a step of completing the plurality of playing hands 70 with new face up cards, as shown in FIG. 4, 8 and 10. A ranking is then determined for each of the completed playing hands, as shown in FIGS. 4, 8 and 10. For example, in FIG. 4, three hands have rankings of a pair of Jacks or better and one hand with a Straight.

In still another aspect, a method is provided for facilitating play of a multiple-hand poker game. The method comprises a step of receiving a wager associated with a plurality of hands to be played. For example, the player may wager a given amount (say, $ 10, or some number of units of wager) that the total sum of poker hand rankings for N hands will be equal or greater than a certain score. The wager size is indicated in the coin size icon 48 of FIG. 1. A pay table (set of boxes 22-38 in FIG. 1, set of boxes 115 in FIG. 7, field 117 in FIG. 9) may be provided on the screen display to show the odds associated with poker hand rankings that provide for a payback. Here, N is the number of hands that are played in the multi-hand poker game. N could be any integer of 2 or more, such as four, ten, fifty or even more. The method continues with the steps of dealing a pool hand 12 comprising a plurality of face up cards, wherein the pool hand is not a played hand. (See FIGS. 2, 7, 9). The method continues with the steps of receiving a selection designating none, one or more of the cards of the pool hand as held cards, retaining the held cards in a face up orientation and turning face down any cards of the pool hand not designated as one of the held cards (FIGS. 3, 7, 9), reproducing the held cards in a plurality of playing hands, completing the plurality of playing hands with new face up cards, and determining a ranking of each of the completed playing hands, as shown in FIGS. 4, 8, 10. The method continues with the step of determining a payout amount based on the ranking of each of the played hands, the wager and a pay table. The payout can be determined as explained above.

In still another aspect, an apparatus is provided for playing a multiple-hand poker game. The apparatus comprises a storage medium containing set of machine-readable instructions for controlling a display device, such as a video poker machine or terminal, computer display, or display of any other gaming device. The set of instructions can be downloaded as an executable file from a web site, for example in an on-line gaming situation, or stored locally on the game device, as in the case of a video poker terminal. The machine readable instructions comprise instructions for generating the following displays on the display device: (1) a pool hand 12, (2) a plurality of playing hands 70 for playing a multiple-hand poker game; (3) a pay table (boxes 22-38, 115, field 117) comprising a display of poker hand rankings and the associated payout odds for each hand in the rankings, (4) a control section 18, the control section comprising at least one of wagering controls (e.g., icons 44, 46, 48), a deal icon and a draw icon (which can be combined as shown in the Figures); and (5) ranking indicia 74, 76 for illustrating the poker hand ranking of at least one of the playing hands. The ranking indicia can be superimposed over the played hand, as shown in FIGS. 4 and 8. For example, if a hand has a poker hand ranking of a Flush, the ranking indicia "Flush" can appear superimposed over the hand. The ranking indicia may also display the payout for that hand, as shown in indicia 74 and 76 in FIG. 3. The total payout for all the played hands is determined by summing the individual payouts for each hand as explained above.

At the completion of the multi-hand poker game, the player can optionally play a side game to double their money. The player activates the double icon 50. The screen of FIG. 5 then appears. The side game consists of showing one card randomly selected as a face up card 80 (here the Four of Hearts), and four face down cards 82 dealt from the same deck. The player selects one of the face down cards, and then all four cards 80 are turned over and the card they selected is highlighted. If the selected card has a higher value than the face up card, the player doubles their money. If the selected face down card is of an equal or lower value, they lose the money they won in the multi-hand game.

Figure 5:
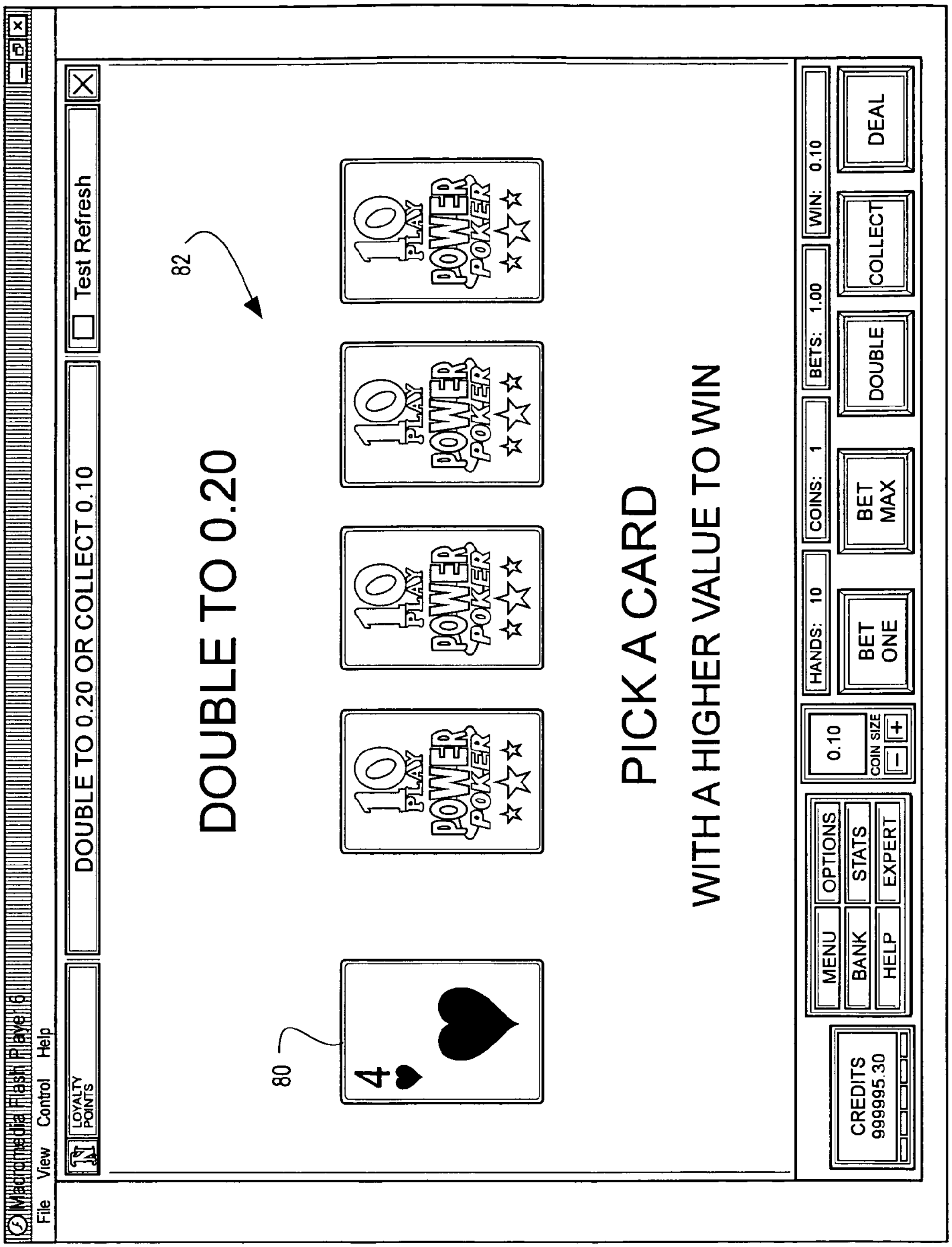
FIG. 5 shows a screen shot in a "double your money" side wager game, by which a player can double their winnings after playing all ten hands as shown in FIG. 4. The player selects one of the face-down cards and doubles their money if the card they selected is ranked higher than the displayed card.
Figure 6:
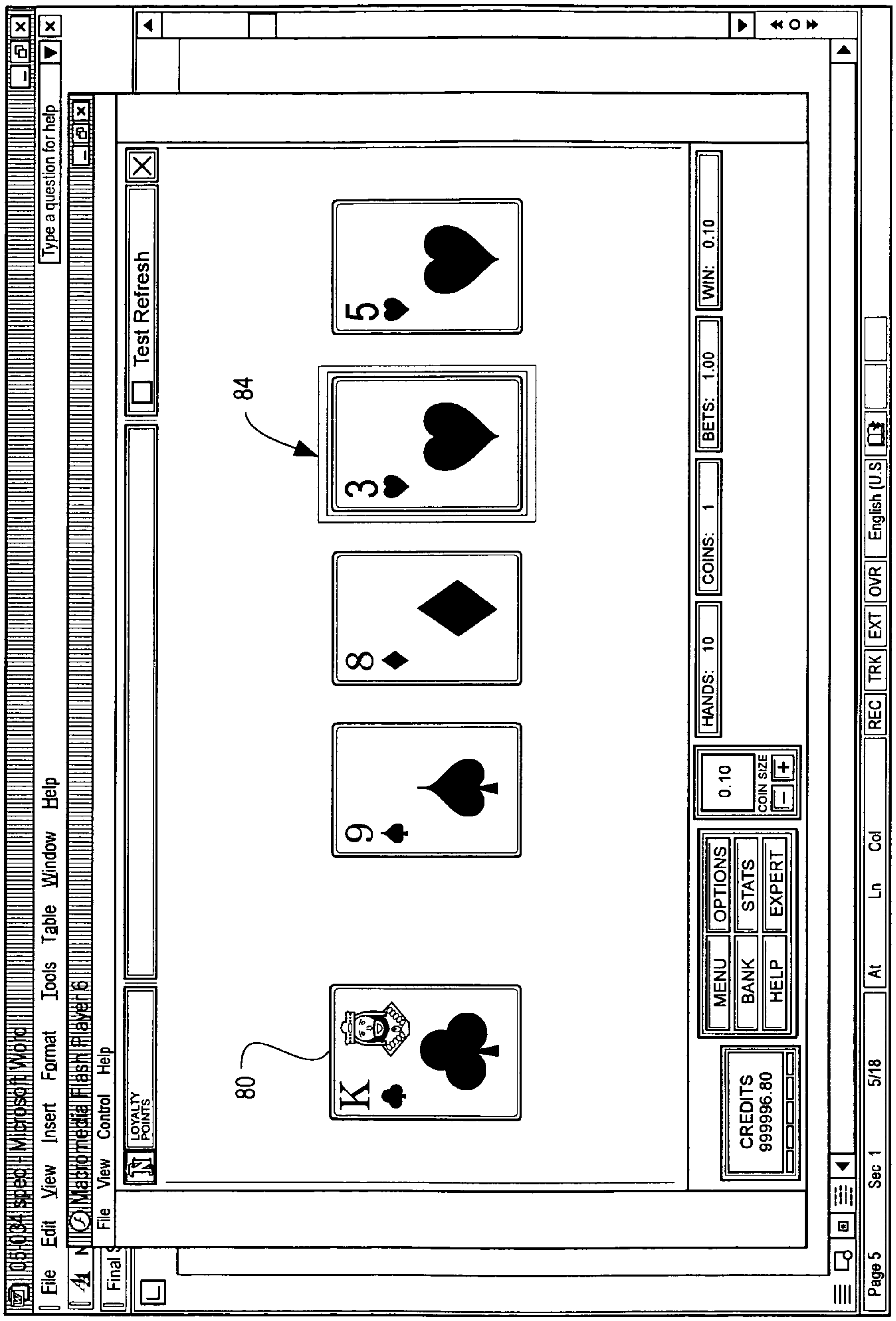
FIG. 6 shows a screen shot in the "double your money" side wager, in which the displayed card is a King, and after the player has made a selection of one of the face down cards.

In the example of FIG. 5, the player was fortunate in being dealt the Four of Hearts 80, as the changes are good that a card they select from the four cards 82 will be a five or better. However, as shown in FIG. 6 the player could be dealt a high card, such as a King, as the face up (card 80), and none of the four cards in the pool 82 are an Ace. Thus, the player will lose their wager regardless of which card they select. In this example, the player selected the third card over 84 (which turned out to be the Three of Hearts) and loses the side wager.

The disclosed embodiments meet a need in the art for an improved multi-play poker game, and associated graphical user interface design, which enhances the user experience. To more fully understand this aspect of the disclosure, a discussion of the graphical user interface (GUI) aspects pertaining to electronic games that are played on-line will described in greater detail.

The primary function of a GUI in an on-line or electronic game is primarily to give the player a means by which he is able to interact with the game. The GUI also provides a means of communication between the player and the remotely located gaming server. The GUI permits necessary information to be presented to the player, and provides controls by which the player can give effect to his decisions during game play.

A good GUI is a one that correctly reflects the goals of the player. Information is displayed to the player at the correct times and in the correct context during game play and the player is guided through the game task flow. A good GUI makes the correct use of information, illustrations and heuristic guidelines to ensure that the player can interact with the game as effortlessly as possible.

Conversely, a poor GUI design is one which has been designed without consideration for what the goals of the player are. A bad GUI can also result from a poor graphical interface design. Poor graphical interface design arises mainly through poor choice of colors, fonts, image sizes, and location of fonts and images on a screen. This leaves the player with no visual clues as to where he should be focusing his attention on the screen.

One of the reasons why it is desirable to have a good GUI is because it can produce positive psychological effects on a player. One of the ways in which this can be observed can be in the confidence levels of the player. If a GUI is easy to use, then it leaves the player feeling confident about his abilities to interact with the interface. Players do not like to feel stupid or inadequate, so they will often choose a game that is easier to play over a game that is more difficult to play. If the player feels like they do not understand the GUI or how to interact with the game, they will walk away from it and may never play it again.

A further way in which a good GUI can have a positive psychological effect on a player is if the graphical interface design leaves the user with a sense of credibility and trustworthiness in the game (and the web site or other source of the game). Players will choose a trustworthy and credible looking interface over one that looks untrustworthy and disreputable.

Effective GUI design is especially important with on-line gaming. A gaming site may potentially attract a large number of players, and a significant amount of money may be wagered at the site. The hosts of such sites will only generate revenues and profits if the users are having a satisfying experience with the GUI associated with the games and continue to play, and if the site can attract new players, including complete novices. If the players are not satisfied, i.e., the GUI design is a poor one, they will go elsewhere for their game playing. Accordingly, effective GUI design for on-line games is important to the success of any on-line gaming site. This is particularly true for multi-play poker games.

The GUI features described herein provide for an enhanced user interface experience. In particular, the ranking indicia (FIGS. 4, 8 and 10) provide a clear and convenient format for showing the results of play. The ranking indicia make the game results, and scoring, readily understood even by novices. These features establish ready ways of verifying the results of the play and, establishing the all-important trust in the integrity of the game, which is crucial to loyalty and repeated use. The control section aspect (FIG. 1, 18) again increases user control over game playing and enhances the user experience. The control section 18 further emulates a casino experience. As such, the features provide a more complete and satisfying user interface experience in playing multi-hand poker.

The user interface features of the present game design are superior to previous game designs from a GUI perspective, for several reasons. Firstly, the game design is clearer as it is easier for the player to know on which hand he has to make his hold decisions because, as shown in FIGS. 1, 2, 7 and 9, only the cards of the pool hand are initially displayed to the player. No other hands are displayed to the player at this stage of the game. In previous games the card backs of all the played hands, as well as the pool hand were displayed.

Secondly, in previous designs, all held cards were immediately reproduced in each of the played hands, so it is confusing to the player as his eyes are drawn naturally away from the pool hand to the played hands, and making it difficult for the player to maintain attention on the pool hand until the player has completed his hold decisions. In the present design, however, the user concentrates initially on just the pool hand 12 (FIGS. 2-3, 7 and 9). The held cards are reproduced in the played hands after the player has completed his hold decisions (FIGS. 4, 8, 10).

Furthermore, the position of the pay table in FIGS. 1-4, 7-10 are conveniently located in the player's natural locus of attention. The player's natural locus of attention is towards the middle of the screen, the region of the display where the playing hands are displayed.

Additionally, as shown in FIGS. 1, 2, 7 and 9, the present game design makes use of a single simple border image 16 as a placeholder to indicate the position where a played hand will appear. The present game design is much simpler and results in a less cluttered interface from a visual perspective.

The present game design creates increased trust for the player relative to previous designs which use of five card backs to represent each played hand. The prior designs gives rise to an impression that each of the played hands has been pre-dealt from the start of the game. In contrast, the present design clearly shows the user that the playing hands are not dealt until after the selection of held cards has occurred and the user presses the draw icon 20, as is illustrated in FIGS. 3, 4, and 7-10.

The present game design provides a much better use of screen real estate as there is more unused space than previous designs, which leaves the user feeling less stressed with the amount of information he needs to absorb. For example, the pay table in FIGS. 1-4 has been reduced in height, which has left the game interface with more unused real estate, thus allowing the player to focus more easily on the play area of the display. Thus, the present game design provides a more credible and trustworthy interface, leading to increased player confidence. This aspect is increasingly important as the number of played hands in the game increases to, say, 50 or 100 played hands per game.

Another feature is the difference in relative size of the cards in the pool hand and the cards of the played hand. Note, in FIGS. 1-4, that the pool hand cards 12 are displayed much larger than the card in the played hands. The difference in size between the cards in the pool hand and the played hands is more correct from a rules and monetary perspective, as the pool hand carries no wager and serves a different function than the played hands.

In the present game design, replication of held cards does not occur simultaneously in the played hands at the time of selection of held cards, as can be appreciated from inspection of FIGS. 3 and 4 and 7-10. Rather, the acts of selection of held cards in the pool hand 12 (FIGS. 3, 7, 9) and dealing of cards in the playing hands after pressing the draw icon 20, as shown in FIGS. 4, 8 and 10, are separated from each other. This minimizes distraction while the player is trying to make his selection of designated held cards in the pool hand 12. A further reason for not duplicating the held cards in the playing hands at the time of designation of held cards in the pool hand is because the user's locus of attention is on the pool hand 12 and the player will, in any event, not see or notice changes in the played hands.

WEB-BASED GAMING EMBODIMENT

As noted previously, the games of FIGS. 1-10 can be played on a computer that has a connection to the World Wide Web. This section of the disclosure will describe the apparatus, processing, and message flow for playing multi-play poker games with a pool hand in a Web-based gaining environment.

Figure 11:
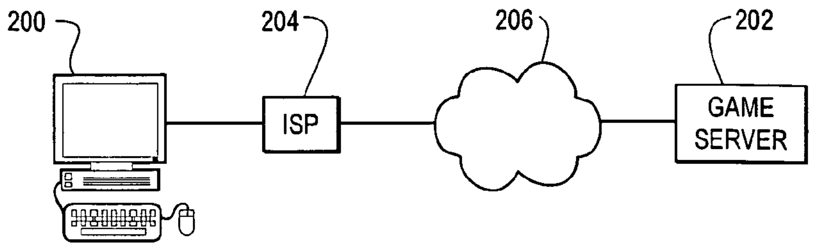
FIG. 11 is a network diagram showing a client computer which connects to a gaming server over an Internet Protocol network such as the World Wide Web in order to download gaming software and exchange messages with the gaming server and thereby play multi-play poker games with a pool hand as illustrated in FIGS. 1-10.

FIG. 11 is a network diagram showing a client computer 200 which connects to a gaming server 202 via an Internet Service Provider 204 and Internet Protocol network 206 such as the Internet. The client computer 200 downloads gaming software from the gaming server 202 and exchanges messages with the gaming server 202 as described below to play multi-play poker games with a pool hand as illustrated in FIGS. 1-10.

At the hardware level, the client computer 200 may take the form of any general purpose computing device such as a personal computer running a Windows 2000, Windows XP, Windows ME and the like operating system, or alternative such as a Linux operating system. Only one such computer 200 is shown, but in practice any number of client computers may be connected simultaneously with the gaming server 202 and play the games. The gaming server 202 takes the form of a general purpose computing platform and may operate, for example, under a Windows Server 2003 operating system or other state of the art system. The gaming server 202 may include other functions, such as an HTML web page server. In a representative embodiment, the gaming server is managed by a entity offering Internet casino gaming services via a presence on the World Wide Web.

Figure 12:
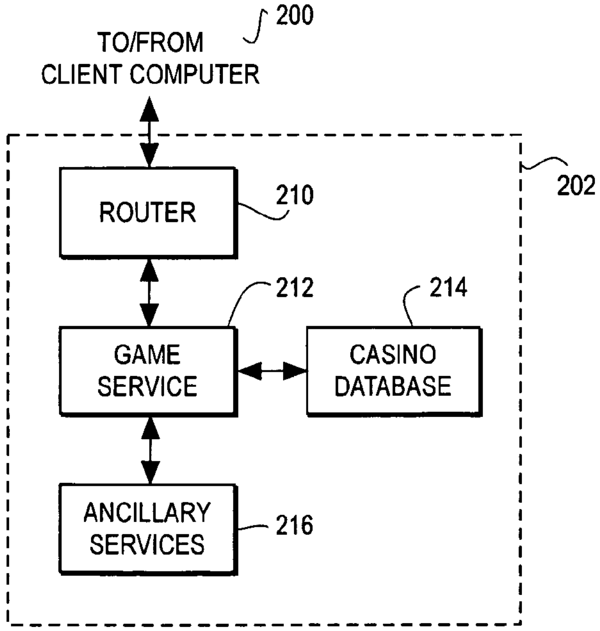
FIG. 12 is a more detailed diagram of the gaming server showing the software modules included in the gaming server in a preferred embodiment.

FIG. 12 is a more detailed diagram of the gaming server 202 showing the software modules included in the gaming server 202 in a preferred embodiment. The modules include a router module 210, a game service module 212, a casino database module 214, and an ancillary services module 216.

The router 210 provides one point of contact for all download clients 200 communicating with the gaming server 202. A download client 200 establishes a connection to the router 210 when a player using the download client 200 wishes to play a game. The router 210 receives a message from the download client and passes the message to the game service 212 for processing.

In the illustrated embodiment, the game service module 212 is written as one or more Windows Server 2003 services. The game service 212 generates an outcome for the game, determines the results of any wagers and transmits the outcome and the result of the wager back to the download client. The processing logic executed by the game service module 212 is explained in more detail in the flow chart of FIGS. 14-18.

The casino database 214 is used to log the state of a player's session with the casino. The game service 212 on the gaming server 202 writes the outcome of the game and the result of the wager to the casino database 214, before the outcome and the result of the wager are transmitted back to the download client 200. The casino database 214 uses a state engine such that if the download client 200 disconnects from the gaming server 202 for whatever reason (say, communication failure or session termination by the player), the player will, upon subsequent reconnection with the gaming server 202, be presented with an identical screen display and game state as when disconnection occurred.

The server 202 also includes an ancillary services module 216 that performs ancillary functions related to operation of the gaming site, such as banking, player login, player registration, and the like.

The client computer 200 executes client software that is either downloaded from a remote download server and subsequently installed on the client computer, or is installed directly from a storage medium such as a compact disc. In the illustrated embodiment, the software is downloaded directly from the gaming server 202.

Figure 13:
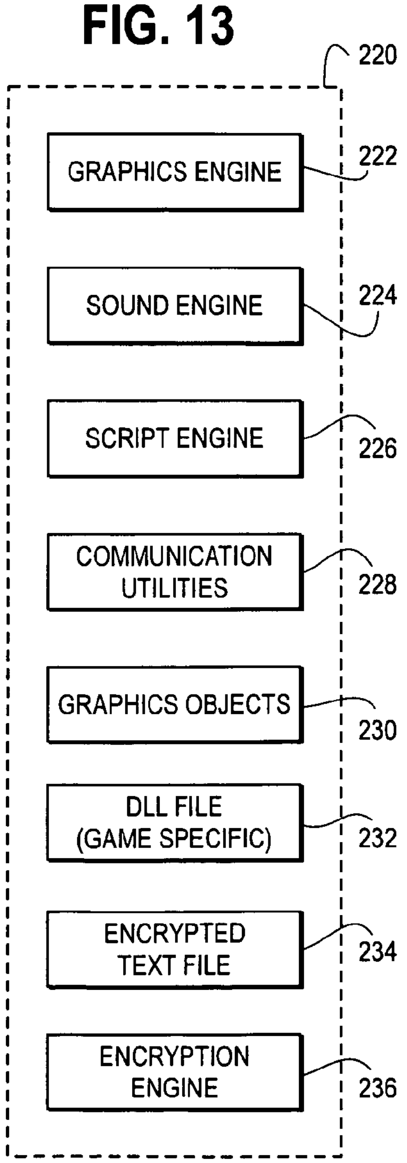
FIG. 13 is a more detailed diagram of a set of software modules which are downloaded onto the client computer in order to communicate with the gaming server and play the multi-play poker games with a pool hand as illustrated in FIGS. 1-10.

FIG. 13 is a more detailed diagram of a set of software modules 220 which are downloaded onto the client computer 200 and stored locally in memory in the computer 200 in order to communicate with the gaming server 202 and play the multi-play poker games with a pool hand as illustrated in FIGS. 1-10. These modules include a graphics engine 222 which renders graphics on the screen of the client computer 200, a sound engine 224 which plays sound effects occurring during play, a script engine 226 which renders text on the screen, communications utilities 228 which enable the client computer 200 to communicate with the gaming server 202, a set of graphics objects 230 such as, for example the cards of a deck of cards, buttons and text objects, a game-specific Dynamic Link Library (DLL) file 232 that contains all the logic required for the game, and which controls the presentation of the game to the player, an encrypted text file 234 that tells the game where to position the graphics, the buttons, what graphics to load, etc., and an encryption engine 236 that provides 128-bit encryption of data communication between the download client 200 and the gaming server 202.

FIGS. 14-18 are a flow chart showing the flow of messages 300 between the gaming server 202 and the client computer 200, and processing steps performed at both the gaming server 202 and client computer 200, to play the multi-play poker games with a pool hand as illustrated in FIGS. 1-10. The flow of messages 300 is for one turn of the game and the flow may repeat any number of times as the player plays the game repeatedly. The message flow 300 assumes that client computer 200 has initially accessed the web site hosted by the gaming server 202 and registered to play games at the on-line casino, and in the process has downloaded the software modules of FIG. 13. The DLL file has been loaded for processing by the host processor (not shown) in the client computer 200 and the display of FIG. 1 has been presented to the user on the client computer 200. Reference should be made to FIGS. 1-4 and 11-13 in the following discussion.

Figure 14:
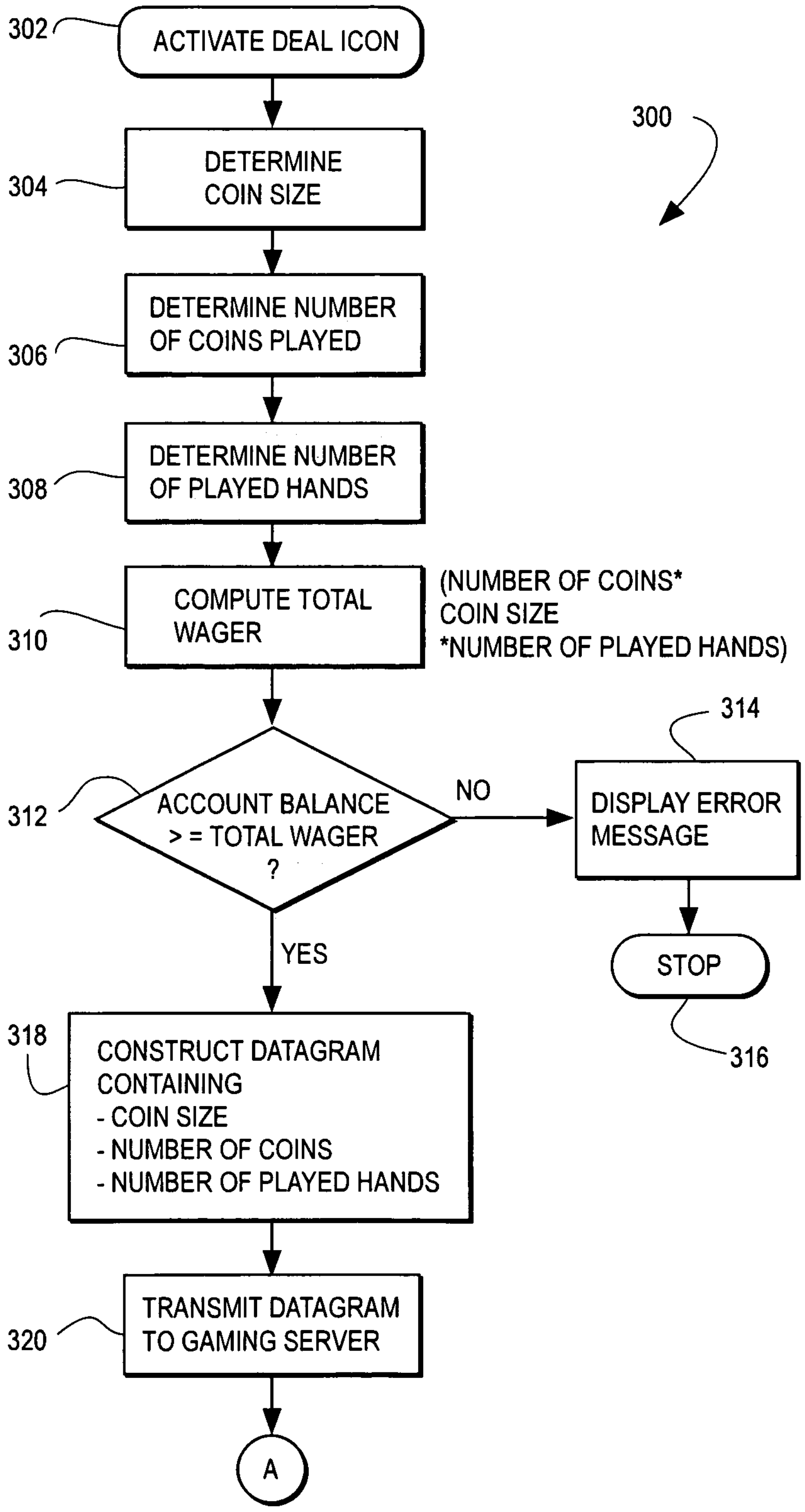
FIGS. 14-18 are a flow chart showing the flow of messages between the gaming server and the client computer, and processing steps performed at both the gaming server and client computer, to play the multi-play poker games with a pool hand as illustrated in FIGS. 1-10.
Figure 15:
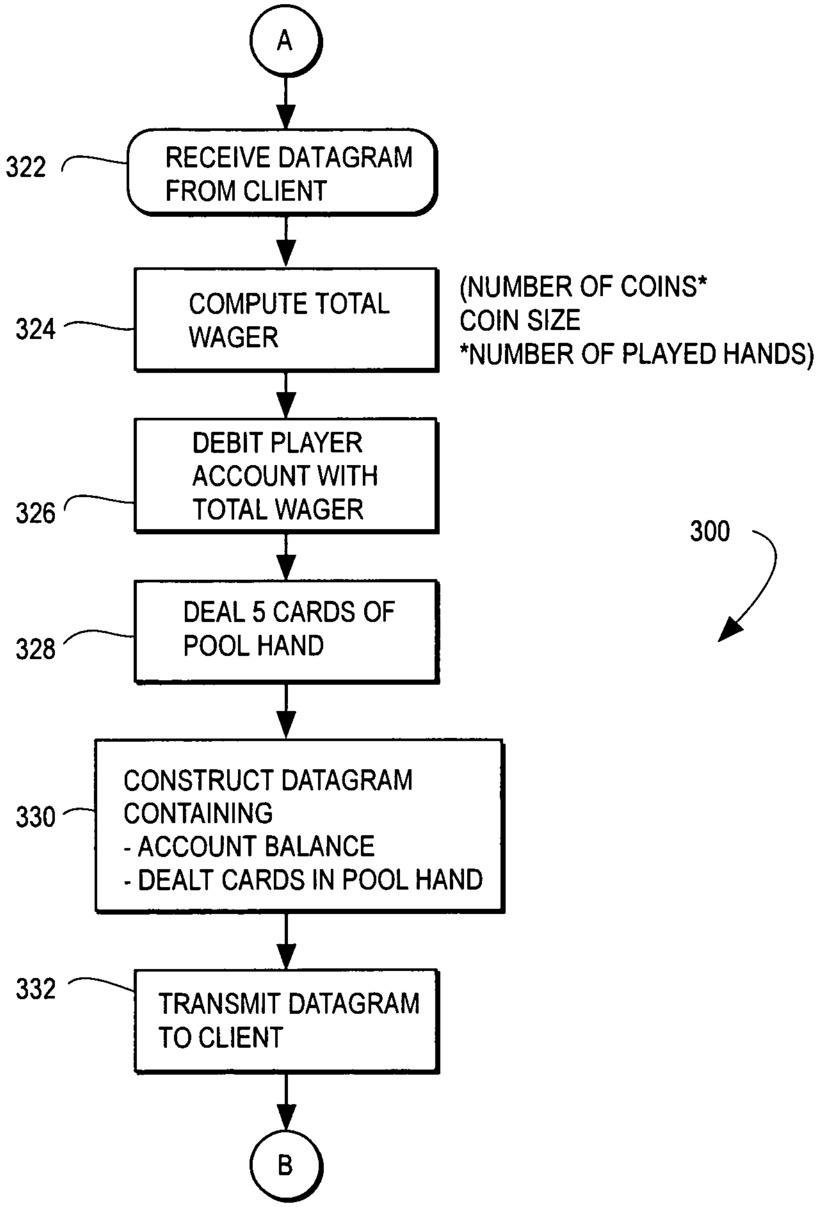
Figure 16:
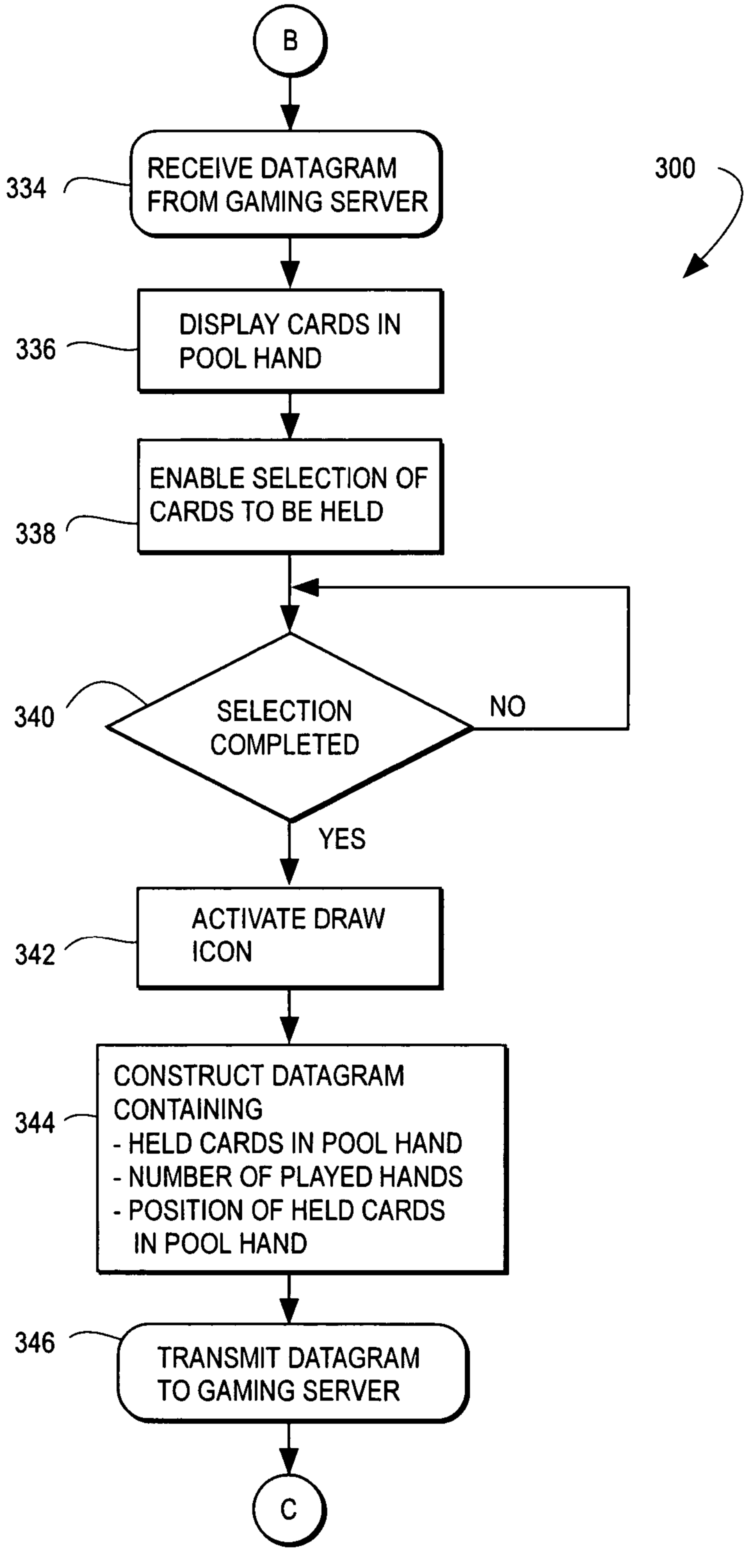
Figure 17:
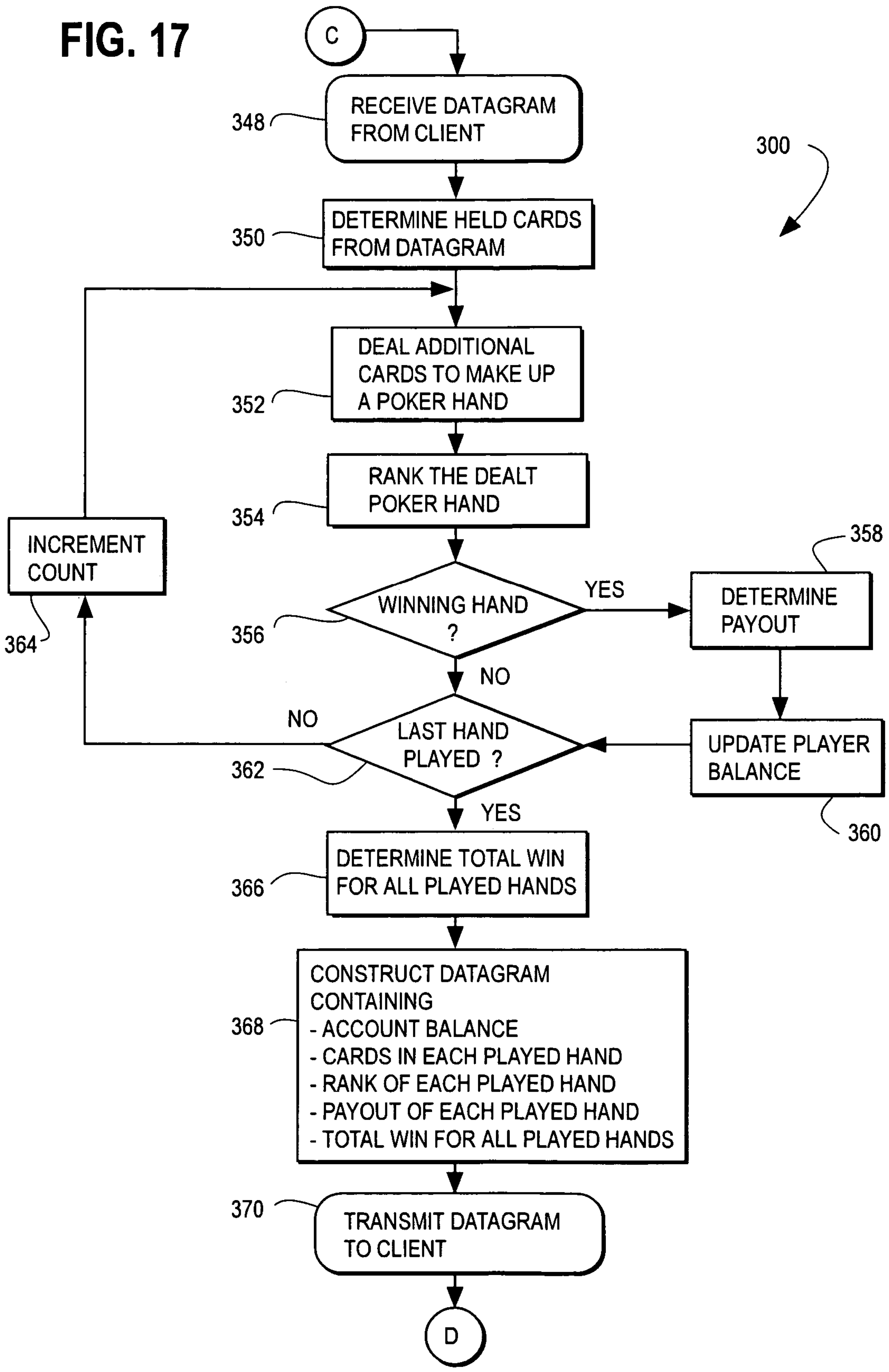
Figure 18:
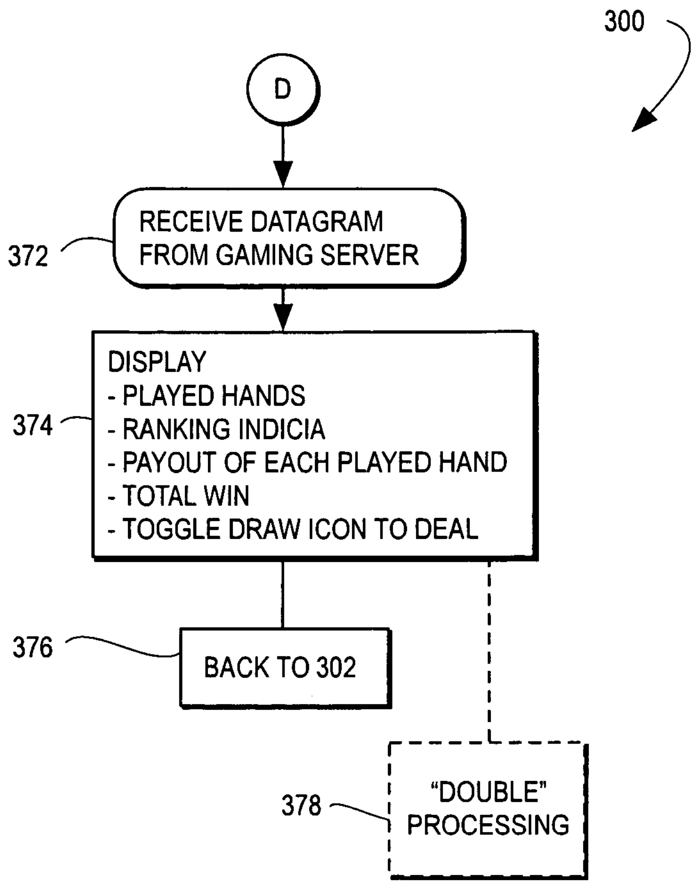

Starting with FIG. 14, the process starts at step 302 with the activation of the DEAL icon 20 in FIG. 1.

At step 304, the client software determines the coin size (0.10 in FIG. 1, see icons 44).

At step 306, the client software determines the number of coins played (depending on the state of activation of the BET ONE and BET MAX icons 46 and 48 in FIG. 1).

At step 308, the client software determines the number of played hands. For example, in a ten hand game such as shown in FIGS. 1-4 the number is 10.

At step 310, the client software computes the total wager as the product of number of coins multiplied by the coin size multiplied by the number of played hands.

At step 312, the client software determines if the account balance is greater than or equal to the total wager. If the answer is no, then processing proceeds to step 314 and display of an error message and the processing stops 316.

If the answer is yes, at step 318 the client software constructs a datagram containing the coin size, number of coins and number of hands played.

At step 320, the datagram is encrypted by the encryption engine 236 in the client software and the communication utilities module 228 transmits the datagram generated at step 318 to the gaming server over the Internet 206. The processing 300 proceeds with the flow chart shown in FIG. 15.

At step 322, the datagram generated at step 318 is received at the router module 210 in the gaming server 202 and passed to the game service 212.

At step 324, the game service 212 computes the total wager.

At step 326, the game server debits the player account balance by the total wager amount.

At step 328, the game server "deals" five cards of a pool hand. In practice, this step may take the form of random selection of five cards from a standard deck of playing cards (i.e., the digital equivalent of this action) and storage of data indicating the selection of cards in memory.

At step 330, the game service 212 constructs a datagram containing the updated account balance and the five cards dealt in the pool hand 12.

At step 332, the datagram generated in step 330 is sent to the router module 210 and transmitted over the Internet 206 to the client computer 200. The processing flow 300 continues with FIG. 16.

At step 334, the datagram generated at step 330 is received at the client computer 200.

At step 336, the display of the cards in the pool hand 12 face up occurs. (See FIG. 2). The deal icon toggles to DRAW as shown in FIG. 2.

At step 338 the client software enables the user to select cards to be held and the player uses the mouse to click on the displayed pool hand card to select it.

At step 340, the processing determines whether the selection is completed. If not, the selection process at step 338 continues.

At step 342, the selection is completed and the user activates the DRAW icon 20.

At step 344, the client software constructs a datagram containing data signifying the held cards in the pool hand 12, the number of playing hands (10 in the example of FIG. 2), and the position of the held cards in the pool hand 12.

At step 346, the datagram is transmitted to the gaming server 202. The processing flow 300 continues with FIG. 17.

At step 348, the router 210 receives the datagram constructed at step 344 and forwards it to the service module 212.

At step 350, the service module 212 determines the held cards from the datagram.

At step 352, the service module 212 creates a first playing hand by adding to the held cards additional cards selected at random from a deck of playing cards, with the held cards removed, to make up a complete poker hand.

At step 354, the poker hand "dealt" at step 352 is ranked.

At step 356 the ranking is analyzed to determine whether it is a "winning hand", i.e., has a minimum poker hand ranking (Jacks or better in the Game of FIG. 1).

If the hand is a winning hand, the processing proceeds to step 358 and the service module 212 determines the payout and updates the player balance at step 360.

If the hand is not a winning hand (and after step 360 is performed), the processing proceeds to step 362, where a check is made to determine whether the hand just processed in steps 352-360 is the last hand.

If no, a count is incremented at step 364 and the processing loops back to step 352. Steps 352-362 repeat until all the hands in the game are created and processed.

At step 366, after the last hand has been created and processed, the service module 212 determines the total win for all played hands by summing up the payouts calculated at step 358.

At step 368, the service module 212 constructs a datagram containing the updated account balance, the cards in each played hand, the rank of each played hand, the payout of each played hand, and the total win or payout for all the played hands.

At step 370, the datagram generated at step 368 is sent from the router 210 to the client computer 200 over the Internet 206. The processing continues with the flow chart shown in FIG. 18.

At step 372, the datagram generated at step 368 is received at the client computer 200.

At step 372, the display of FIG. 4 is generated, and in particular the display on the computer includes the display of the played hands 70, the ranking indicia 74, 76 including the payout for each played hand, the total win (item 90 in FIG. 4). The deal icon toggles to DEAL as shown in the lower right of FIG. 4.

If the player then activates the DEAL icon the process 300 of FIGS. 14-18 repeats. If the player activates the DOUBLE icon 50 (FIG. 4), the double side wager is played as explained previously in conjunction with FIGS. 5 and 6 and the client computer 200 and gaming server 202 conduct additional processing and exchange messages to play the side wager, as indicated at 378. These details of this processing are omitted from the present discussion but can be readily developed by persons skilled in the art.

The processing of FIGS. 14-18 is essentially the same for the play of the games of FIGS. 7-10.

From the foregoing, it will be appreciated that we have described a gaming server 202 adapted for communication with a remote gaming device 100 over a network 206. The network 206 could be a local area network in an embodiment where the remote gaming device 100 and the gaming server 202 are in the same building (e.g., in a casino environment). The gaming server 202 comprises a computing platform (e.g., Windows Server 2003) and a game service module 212 implemented in software executable by the computing platform. The game service module 212 includes instructions for receiving a datagram from the remote gaming device 202 representing a wager on a plurality of hands in a multi-play poker game (datagram constructed at step 318), and instructions responsively generating a pool hand 12 (step 328) comprising a random selection of cards and transmitting a datagram (steps 330, 332) containing data representing the pool hand 12 to the remote gaming device for selection of cards to be held in a multi-play poker game (FIG. 3, steps 336, 338, 340).

From the foregoing it will also be appreciated that we have described a client computer 200 for playing a multi-play poker game with a pool hand 12, comprising a general purpose computing platform (e.g., PC with Windows operating system), and a memory storing gaming software comprising a set of machine-readable instructions. The instructions include communications utilities 228 (FIG. 13) for enabling the client computer to communicate with a remotely located gaming server and a file (232, FIG. 13) containing logic required for the multi-play poker game with pool hand and for controlling the presentation of the game to the player. The game is presented to the player such that a pool hand is presented initially to the player and the player is able to select cards to be held from the pool hand (as shown in FIGS. 1-4 and 7-10). The logic includes logic transmitting a datagram (344, FIG. 16) containing the selected held cards to the gaming server 202 for subsequent creation of multiple poker hands containing the held cards.

While presently preferred embodiments have been described in some detail, persons skilled in the art will appreciate that variation can be made from the specifics of the disclosed embodiments without departure from the scope of the invention. For example, the detailed processing shown in FIGS. 14-18 is offered by way of example and not limitation as to particular processing sequence and communication flow between the client and server. Other processing steps or message flow sequence can occur. This scope of the invention is to be determined by reference to the appended claims.

What is claimed is:

1. A method, comprising:

displaying, in a first region of a display of a gaming workstation, a pool hand comprising a plurality of face up cards, wherein the pool hand is not a played hand;

displaying, in a second region of the display of the gaming workstation, a plurality of discrete, bounded placeholder areas for a playing hand arranged in a plurality of rows of placeholder areas and a plurality of columns of placeholder areas, wherein the first region differs from the second region;

designating, using the gaming workstation, one or more held cards from among the plurality of face up cards of the pool hand;

after designating the one or more held cards;

changing a color of each card of the pool hand to indicate that the pool hand has been utilized; and reproducing the one or more held cards into each playing hand of a plurality of playing hands, wherein each playing hand of the plurality of playing hands is respectively associated within one discrete bounded placeholder area of the plurality of placeholder areas;

completing the plurality of playing hands with new face up cards;

displaying, using the display of the gaming workstation, the completed plurality of playing hands, wherein each completed playing hand is respectively displayed within the one placeholder area associated with the completed playing hand; and determining a ranking of each of the completed playing hands.

2. The method of claim 1, wherein each placeholder area comprises a border.

3. The method of claim 1, wherein the gaming workstation is configured with a touch screen, and wherein designating the one or more held cards comprises designating a held card of the one or more held cards using the touch screen.

4. The method of claim 1, further comprising superimposing ranking indicia over at least one completed playing hand.

5. The method of claim 4, wherein superimposing the ranking indicia comprises superimposing the ranking indicia over each completed playing hand having a predetermined minimum poker hand ranking.

6. The method of claim 2, wherein displaying the completed plurality of playing hands comprises respectively displaying each completed playing hand within the border of the one placeholder area associated with the completed playing hand.

7. A method, comprising:

displaying, in a first region of a display of a gaming workstation, a pool hand comprising a plurality of face up cards, wherein the pool hand is not a played hand;

displaying, in a second region of the display of the gaming workstation, a plurality of discrete, bounded placeholder areas for a playing hand arranged in a plurality of rows of placeholder areas and a plurality of columns of placeholder areas, wherein the first region differs from the second region;

receiving, at the gaming workstation, a selection designating one or more held cards from among the plurality of face up cards of the pool hand;

after designating the one or more held cards:

changing a color of each card of the pool hand to indicate that the pool hand has been utilized, on the display of the gaming workstation, retaining the one or more held cards in a face up orientation and turning face down any cards of the pool hand not designated as held cards, and reproducing the one or more held cards into each playing hand of a plurality of playing hands, wherein each playing hand of the plurality of playing hands is respectively associated with one placeholder area of the plurality of placeholder areas;

completing the plurality of playing hands with new face up cards;

displaying, using the display of the gaming workstation, the completed plurality of playing hands, wherein each completed playing hand is respectively displayed within the one placeholder area associated with the completed playing hand; and determining a ranking of each completed playing hand.

8. The method of claim 7, wherein displaying the pool hand comprises dealing the pool hand from a deck of standard playing cards, and wherein completing the plurality of playing hands comprises completing the plurality of playing hands from a separate standard deck of playing cards minus the designated one or more held cards.

9. The method of claim 7, further comprising graying out the pool hand on the display after the one or more held cards have been designated.

10. The method of claim 7, wherein the pool hand and each playing hand of the completed plurality of playing hands have the same number of cards.

11. The method of claim 10, wherein the pool hand and each playing hand of the plurality of playing hands has five cards.

12. The method of claim 7, wherein automatically reproducing the one or more held cards comprises automatically reproducing each held card of the one or more held cards in a position in each playing hand of the plurality of playing hands corresponding to a respective position of the held card in the pool hand.

13. The method of claim 7, wherein determining the ranking of each completed playing hand comprises determining the ranking of each completed playing hand according to standard poker hand rankings

14. The method of claim 7, further comprising superimposing ranking indicia over a completed playing hand.

15. The method of claim 14, wherein superimposing the ranking indicia comprises superimposing the ranking indicia over each completed playing hand having a predetermined minimum poker hand ranking

16. A method comprising:

receiving, at a gaming workstation, a wager associated with a plurality of hands to be played;

presenting, on a first region of a display of the gaming workstation, a pool hand comprising a plurality of face up cards, wherein the pool hand is not a played hand;

presenting, in a second region of the display of the gaming workstation, a plurality of discrete, bounded placeholder areas for a playing hand arranged in a plurality of rows of placeholder areas and a plurality of columns of placeholder areas, wherein the first region differs from the second region;

receiving, at the gaming workstation, a selection designating one or more held cards from among the plurality of face up cards of the pool hand;

after designating the one or more held cards:

changing a color of each card of the pool hand to indicate that the pool hand has been utilized, on the display of the gaming workstation, retaining the one or more held cards in a face up orientation and turning face down any cards of the pool hand not designated as one of the one or more held cards, and reproducing the one or more held cards into each playing hand of a plurality of playing hands, wherein each playing hand of the plurality of playing hands is respectively associated with one placeholder area of the plurality of placeholder areas;

completing the plurality of playing hands with new face up cards;

displaying, using the display of the gaming workstation, the completed plurality of playing hands, wherein each completed playing hand is respectively displayed within the one placeholder area associated with the completed playing hand;

determining a ranking of each completed playing hand; and determining a payout amount based on the ranking of each completed playing hand, the wager and a pay table.

17. The method of claim 16, wherein completing the plurality of playing hands comprises completing the plurality of playing hands from a separate standard deck of playing cards minus the designated one or more held cards.

18. The method of claim 16, wherein determining the ranking of each completed playing hand comprises determining the ranking of each completed playing hand in accordance with standard poker hand rankings.

19. The method of claim 16, wherein the wager is apportioned evenly among the plurality of playing hands.

20. The method of claim 16, further comprising superimposing a display of the ranking of a first completed playing hand over the first completed playing hand.

21. The method of claim 16, further comprising superimposing a display of ranking indicia over each playing hand having at least a predetermined minimum poker hand ranking.

* * * * *

UNITED STATES PATENT AND TRADEMARK OFFICE

CERTIFICATE OF CORRECTION

PATENT NO. : 8,602,860 B2
APPLICATION NO. : 11/058680
DATED : December 10, 2013
INVENTOR(S) : Verardi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1465 days.

Signed and Sealed this
Twelfth Day of May, 2015

Michelle K. Lee
*Director of the United States Patent and Trademark Office*